US007734935B2

(12) United States Patent
Takada et al.

(10) Patent No.: US 7,734,935 B2
(45) Date of Patent: *Jun. 8, 2010

(54) DATA PROCESSING METHOD, SYSTEM AND APPARATUS FOR PROCESSING A VARIETY OF DEMANDS FROM A SERVICE PROVIDER

(75) Inventors: Masayuki Takada, Tokyo (JP); Susumu Kusakabe, Kanagawa (JP); Masachika Sasaki, Kanagawa (JP); Tadashi Moriya, Aichi (JP)

(73) Assignee: Sony Corporation, Tokyo (JP)

( * ) Notice: Subject to any disclaimer, the term of this patent is extended or adjusted under 35 U.S.C. 154(b) by 954 days.

This patent is subject to a terminal disclaimer.

(21) Appl. No.: 11/467,797

(22) Filed: Aug. 28, 2006

(65) Prior Publication Data
US 2007/0079144 A1 Apr. 5, 2007

Related U.S. Application Data

(63) Continuation of application No. 11/356,588, filed on Feb. 15, 2006, now Pat. No. 7,178,040, which is a continuation of application No. 10/018,440, filed as application No. PCT/JP01/02992 on Apr. 6, 2001, now Pat. No. 7,046,810.

(30) Foreign Application Priority Data
Apr. 6, 2000 (JP) ............................ P2000-110561

(51) Int. Cl.
*G06F 12/14* (2006.01)

(52) U.S. Cl. ................................ 713/193; 726/9; 713/1
(58) Field of Classification Search ................. 713/193, 713/189; 380/28, 277, 284
See application file for complete search history.

(56) References Cited

U.S. PATENT DOCUMENTS

| 5,878,137 A * | 3/1999 | Ippolito et al. ............... 713/172 |
| 6,005,942 A * | 12/1999 | Chan et al. .................. 713/187 |
| 6,742,715 B2 * | 6/2004 | Everett et al. ................ 235/492 |

FOREIGN PATENT DOCUMENTS

| EP | 973135 A2 * | 1/2000 |
| WO | WO 9852161 A2 * | 11/1998 |
| WO | WO 9852162 A2 * | 11/1998 |

* cited by examiner

*Primary Examiner*—Jung Kim
*Assistant Examiner*—Samson B Lemma
(74) *Attorney, Agent, or Firm*—K&L Gates LLP

(57) ABSTRACT

An IC card issuer issues an IC card and requests a card memory area operator to lend part of a memory area of the IC card to another card memory area user. The card memory area operator provides a memory area division apparatus and various data to the memory area division apparatus under the control of an operator communication apparatus 12. The card memory area user divides the memory area of the IC card into a memory area to be used by the IC card issuer and a memory area to be used by the card memory area user. The operation file registration apparatus writes file data for the card memory area user to the memory area of the card memory area user obtained by the above division.

11 Claims, 32 Drawing Sheets

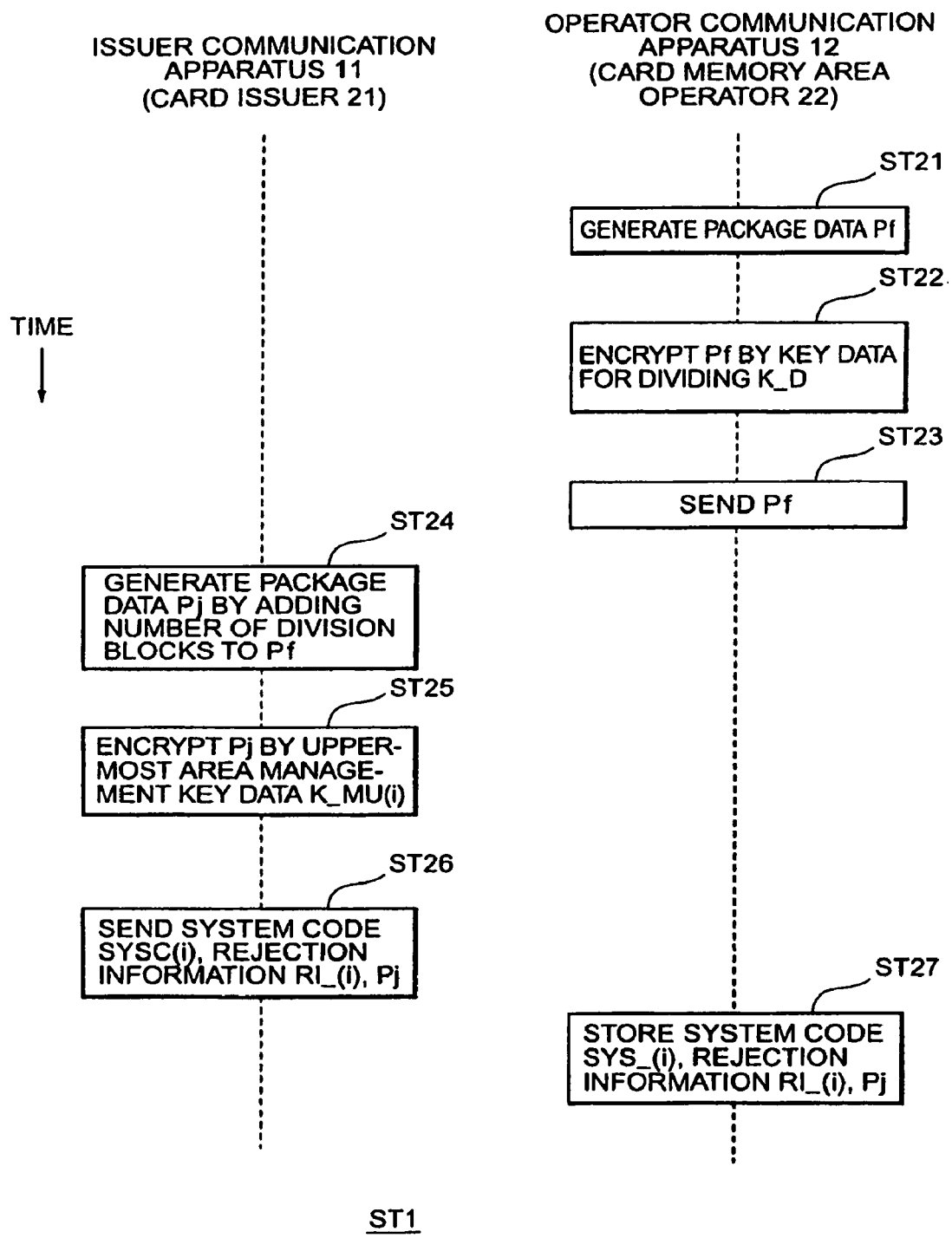

PACKAGE DATA Pf

K_D : KEY DATA FOR DIVIDING

K_MU_(i)) : UPPERMOST AREA
           MANAGEMENT KEY DATA

PACKAGE DATA Pj

PRIMARY ISSUANCE DATA INF_1

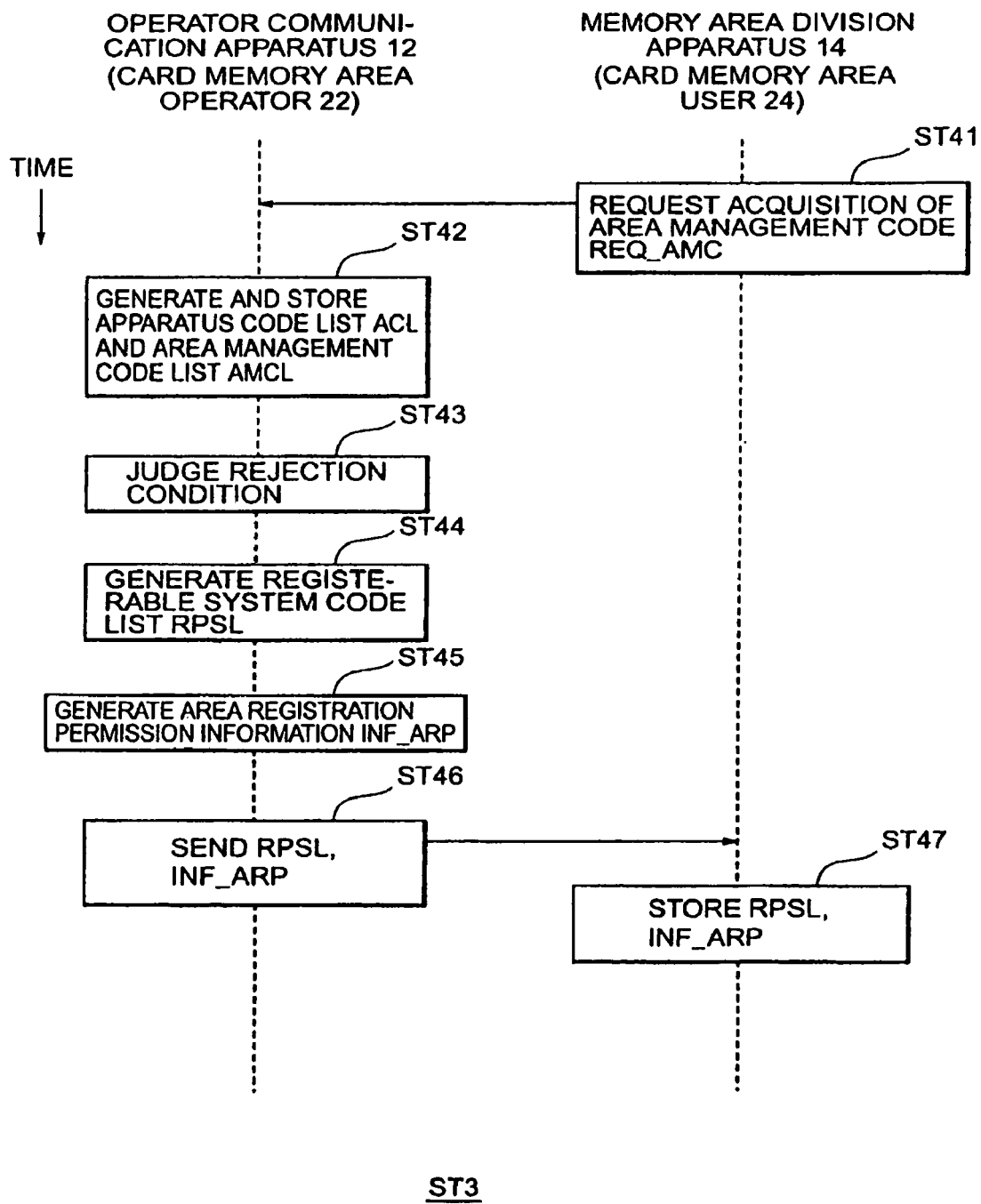

FIG. 14A

| REGISTRATION APPARATUS CODE AC |
|---|
| REJECTION INFORMATION RI_F |
| NUMBER OF REGISTRATION AREAS |
| NUMBER OF BLOCKS OF EACH REGISTRATION AREA |
| NUMBER OF SERVICE CODES |

AREA CODE ACQUISITION REQUEST REQ_AMC

FIG. 14B

| APPARATUS CODE AC |
|---|
| AREA MANAGEMENT CODE AMC_F |
| AREA MANAGEMENT CODE AMC_F |
| . . . |
| AREA MANAGEMENT CODE AMC_F |
| REJECTION INFORMATION RI_F |

APPARATUS CODE LIST ACL

FIG. 14C

| AREA MANAGEMENT CODE AMC_F |
|---|
| AREA MANAGEMENT KEY DATA K_AM_F |
| NUMBER OF AREA BLOCKS |
| SERVICE CODE SC |
| . . . |
| SERVICE CODE SC |

AREA MANAGEMENT CODE LIST AMCL

REGISTERABLE SYSTEM CODE LIST RPSL

AREA REGISTRATION PERMISSION DATA INF_RP

FIG. 18

MEMORY OF OPERATION FILE REGISTRATION
APPARATUS (WHEN ST4 ENDS)

| AREA MANAGEMENT CODE AMC_F |

| AREA MANAGEMENT KEY DATA K_AM_F |

| FILE REGISTRATION PERMISSION DATA FRP (17B) |

FILE REGISTRATION PERMISSION
DATA FRP

FILE REGISTRATION PERMISSION
DATA FRP

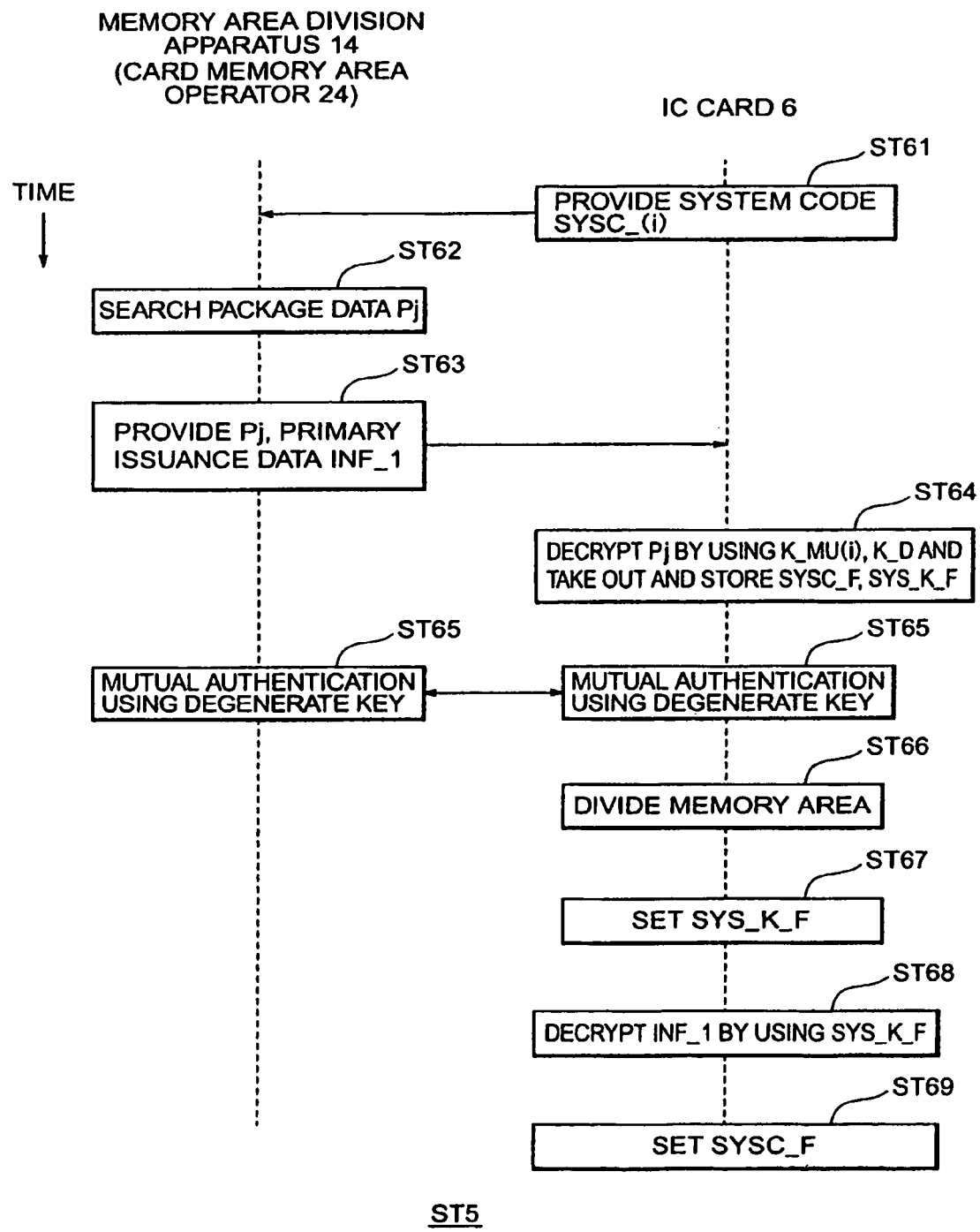

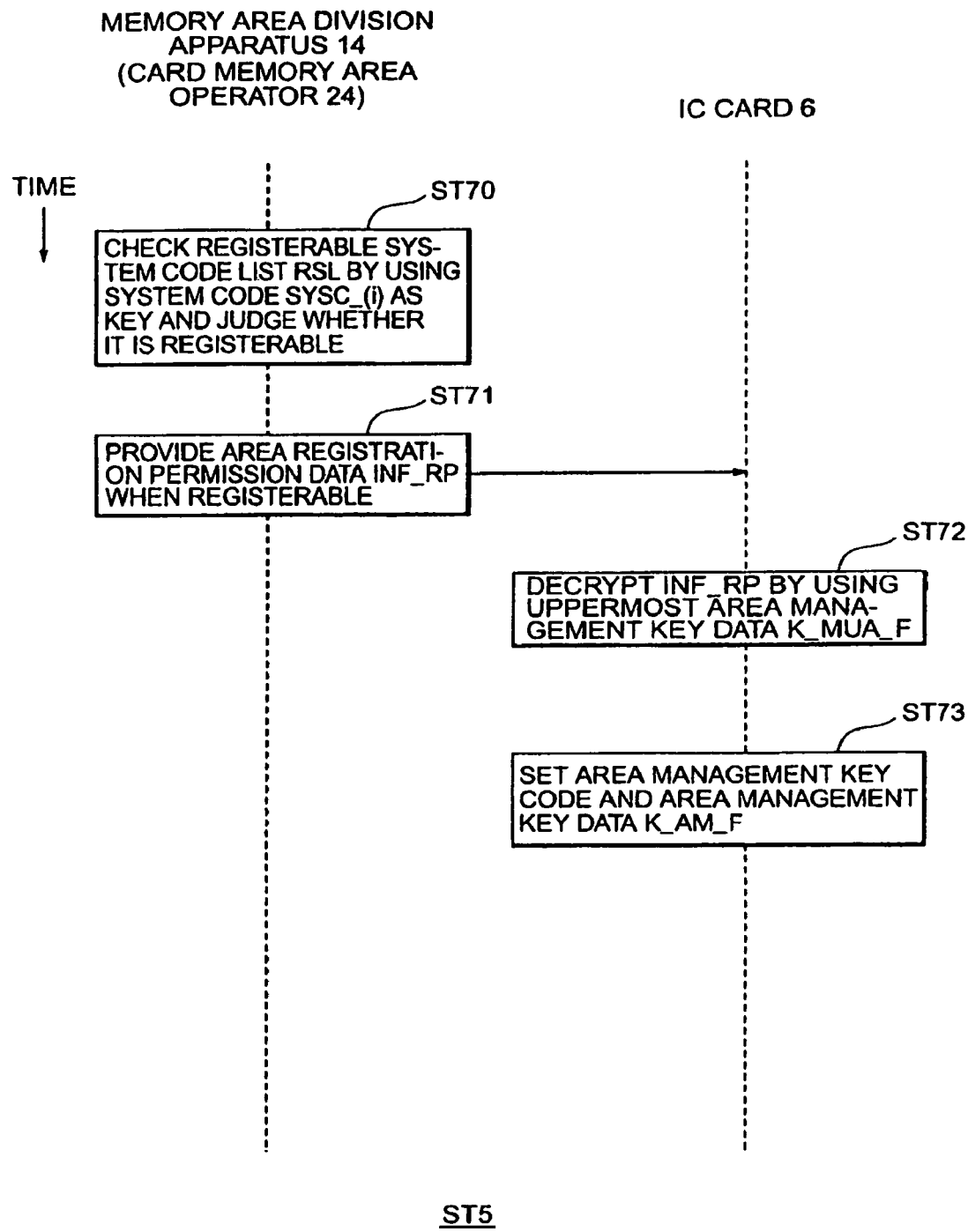

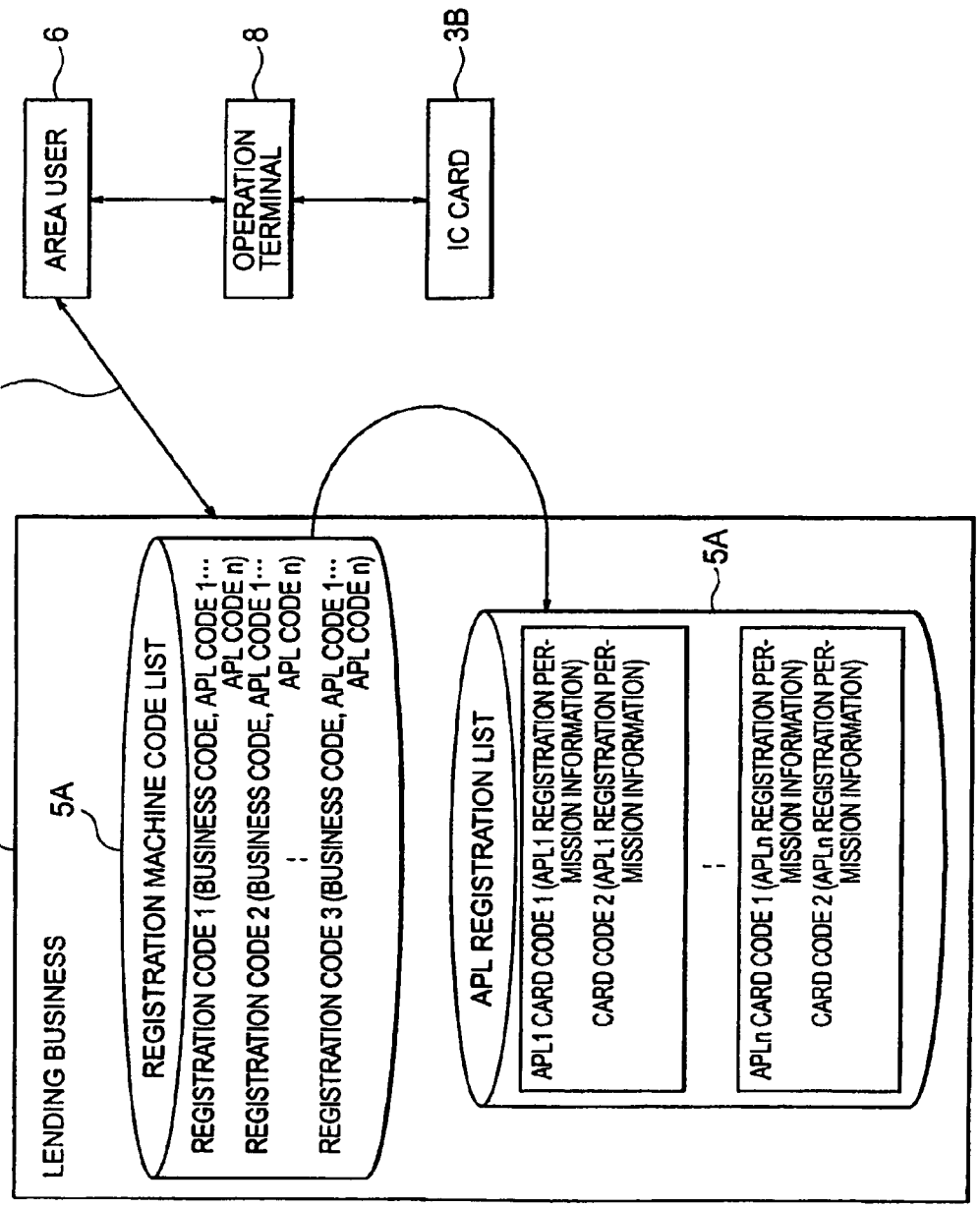

DATA PROCESSING METHOD, SYSTEM AND APPARATUS FOR PROCESSING A VARIETY OF DEMANDS FROM A SERVICE PROVIDER

CROSS REFERENCE TO RELATED APPLICATIONS

The present application is a continuation of U.S. patent application Ser. No. 11/356,588 filed on Feb. 15, 2006 now U.S. Pat. No. 7,178,040 which is a continuation of U.S. patent application Ser. No. 10/018,440 filed on Feb. 28, 2002, issued as U.S. Pat. No. 7,046,810, which claims priority to International Application PCT/JP01/02992, filed on Apr. 6, 2001, which claims priority to Japanese Patent Application No. 2000-110561, filed on Apr. 6, 2000, the disclosures of which are herein incorporated by reference.

BACKGROUND

The present invention relates to a data processing method, system and apparatus that processes a variety of demands from a plurality of service providers by using a single IC (integrated circuit) card.

In the past, in an IC card system, an IC card carried by an individual has been recorded with personal information and used for passing through subway and train turnstiles, controlling entry to and exiting from rooms, etc.

Similar kinds of card-shaped media, for example, pre-paid cards, service cards issued by various stores, and user cards issued by software manufacturers are also in use.

These cards, including the IC cards, are individually issued and supplied by the respective service providers (businesses) relating to the cards.

Note that by making it possible to give an IC card the capacity to enable it to sufficiently store information relating to several services in its built-in memory, several businesses could share use of a single IC card.

In this way, businesses that individually issued cards up until now could reduce the load of issuing the cards and could secure a large number of users, which are difficult for individual businesses to secure. On the users' side, a reduction in the number of cards that a user carries and manages, relieves the user of the trouble of carrying and managing a large number of cards.

When an IC card is shared by several businesses in this way, however, it becomes necessary to deal with a variety of requests. That is, some businesses might desire the convenience of an IC card, as if the card was issued by itself, even when sharing an IC card with other businesses. Also, specific businesses might not want to share an IC card. Furthermore, a reduction in the number of businesses that share a card may also be requested.

The present invention considers the issues above and provides a data processing method, system and apparatus for processing a variety of demands from a service provider when a plurality of businesses share a single IC card.

SUMMARY

To attain the above object, a data processing method of a first aspect of the present invention comprises a data processing method for processing data so that a portable device including an integrated circuit storing memory area division data and first area management key data which is authorized to perform at least one of a write operation to a memory area of said integrated circuit and a rewrite operation to the memory area conditional on the use of the first area management key data makes a second service provider provide a service using part of said memory area of said integrated circuit when issued by a first service provider providing a service using said memory area, comprising having a memory area operation unit managing said memory area division data encrypt first module data including second area management key data by the memory area division data for dividing by and provide the same to the first service provider; having the issuer of the portable device, that is, said first service provider, encrypt second module data including the encrypted first module by using said first area management key data and provide the same to said memory area operation unit; and, under the control of the memory area operation unit, providing the encrypted second module data to the integrated circuit, decrypting the second module data by using the first area management key data in the integrated circuit, decrypting the first module data in the decrypted second module by using the memory area division data, and dividing the memory area to a first memory area to be used for service of the first service provider and a second memory area to be used for service of the second service provider by using the second area management key data obtained by the decrypting.

In the above first data processing method, the second memory area used for service of the second service provider is suitably formed conditional on the second module being decrypted in the integrated circuit and the integrated circuit obtaining the second area management key data.

At this time, since the first module is encrypted by memory area division data, the content of the second area management key data included in the second module can be kept secret from the first service provider. Therefore, the first service provider cannot illicitly generate the second module without the permission of the memory area operation unit.

Further, the second module is encrypted by first area management key data, and the first area management key data is kept secret from the second service provider. Therefore, the memory area operation unit cannot illicitly generate a second module without permission from the first service provider.

Namely, since the second module cannot be generated without using both the first management key data and memory area division data, the integrated circuit cannot obtain second area management key data necessary for generating the second memory area.

Further, since both of the memory area division data and the first area management key data are kept secret from the second service provider, the second service provider cannot generate a second module.

Due to this, insofar as the first service provider, memory area operation unit, and second service provider suitably tie up to perform processing, the second memory area is not formed in the integrated circuit, and greater security can be provided.

Furthermore, the data processing method of the first aspect of the present invention preferably has the integrated circuit divide the memory area into the first memory area wherein at least one of a write operation and a rewrite operation is authorized conditional on use of the first area management key data and the second memory area wherein at least one of a write operation and a rewrite operation is authorized conditional on use of the second area management key data.

Further, the data processing method of the first aspect of the present invention preferably has the integrated circuit further store first system key data and authorize at least one of a write operation to the memory area and a rewrite operation in the memory area conditional on use of the first system key data and the first area management key data; has the memory area operation unit encrypt first module data further including second system key data by the key data for dividing and provide the same to the first service provider; has the first service provider encrypt second module data including the encrypted first module and division condition information indicating the condition for dividing the memory area for use by another service provider by using the first area management key data and provide it to the memory area operation unit; and has the integrated circuit decrypt the second module data by using the first area management key data, decrypt the first module data in the decrypted second module by using the key data for dividing, and divide the memory area by using the second system key data, second area management key data, and division condition information obtained by the decrypting.

Further, a data processing system of a second aspect of the present invention comprises a data processing system for processing so that a portable device including an integrated circuit storing memory area division data and first area management key data which is authorized to perform at least one of a write operation to a memory area of said integrated circuit and a rewrite operation to the memory area conditional on the use of the first area management key data makes a second service provider provide a service using part of said memory area of said integrated circuit when issued by a first service provider providing a service using said memory area, wherein the system has a memory area operation processing apparatus used by a memory area operation unit which manages the memory area division data, a first service provider processing apparatus used by the issuer of the portable device, that is, the first service provider, and a second service provider processing apparatus used by the first service provider; the memory area operation processing apparatus encrypts first module data including second area management key data by the memory area division data and sends the same to the first service provider processing apparatus; the first service provider processing apparatus encrypts second module data including the received encrypted first module by using the first area management key data and sends the same to the memory area operation processing apparatus; the memory area operation processing apparatus provides the received encrypted second module data to the integrated circuit; and the integrated circuit decrypts the second module data by using the first area management key data, decrypts the first module data in the decrypted second module by using the memory area division data, and divides the memory area to a first memory area to be used for service of the first service provider and a second memory area to be used for service of the second service provider by using the second area management key data obtained by the decrypting under control of the memory area operation unit.

Further, a portable device according to a third aspect of the present invention is a portable device mounting an integrated circuit used for a first service provider providing a service wherein the integrated circuit comprises a memory means for storing key data for dividing managed by a memory area operation unit performing processing to make a second service provider provide a service using a part of a memory area of the integrated circuit and first area management key data; an input means for inputting a module including second area management key data issued by the memory area operation unit which is encrypted by the memory area operation unit by using the memory area division data and furthermore encrypted by the first service provider by using the first area management key data; and a processing means for decrypting the input module by using the key data for dividing and the first area management key data, dividing a memory area of the memory means to a first memory area and a second memory area by using the second area management key data in the decrypted module, authorizing at least one of a write operation to the first memory area and a rewrite operation in the memory area conditional on use of the first area management key data and authorizing at least one of a write operation to the second memory area and a rewrite operation in the memory area conditional on use of the second area management key data.

Further, a data processing apparatus according to a fourth aspect of the present invention is a data processing apparatus for processing so that a portable device including an integrated circuit storing memory area division data, a system code for identifying a first service provider, and first area management key data which is authorized to perform at least one of a write operation to a memory area of said integrated circuit and a rewrite operation to the memory area conditional on the use of the first area management key data makes a second service provider provide a service using part of said memory area of said integrated circuit when issued by a first service provider providing a first service using said memory area, wherein the apparatus has a memory means, processing means, and input/output means; the memory means stores rejection information for specifying a service provider which can provide service by the same integrated circuit indicated by the first service provider and the second service provider; the processing means encrypts a first module including second management key data by using the memory area division data; the input/output means outputs the encrypted first module to provide it to the first service provider, receives as input a second module including the encrypted first module and encrypted in the first service provider by using the first area management key data, and outputs the second module to provide it to a memory area division apparatus for dividing the memory area under control of the second service provider so that a part of the memory area of the integrated circuit can be used by the second service provider; the processing means generates a registerable system code list indicating the system code added to the first service provider which can provide service by the same integrated circuit as the second service provider based on the rejection information; and the input/output means outputs the system code list to provide it to the memory area division apparatus.

Further, a data processing apparatus according to a fifth aspect of the present invention is a data processing apparatus for processing so that a portable device including an integrated circuit storing distribution key data, a system code for identifying a first service provider, and first area management key data which is authorized to perform at least one of a write operation to a memory area of said integrated circuit and a rewrite operation to the memory area conditional on the use of the first area management key data makes a second service provider provide a service using part of said memory area of said integrated circuit when issued by a first service provider providing a first service using said memory area, wherein the apparatus has a memory means, input/output means, and processing means; the memory means stores a module including second area management key data issued by a memory area operation unit for managing processing of the data processing apparatus and encrypted by the memory area operation unit by using the distribution key data and a registerable system code list indicating the system code added to the first service provider which can provide service by the same integrated circuit as the second service provider; the input/output means receives as input the system code from the integrated circuit; and the processing means outputs the module to the integrated circuit via the input/output means when it judges that the input system code is indicated in the registerable system code list.

Further, a data processing apparatus according to a sixth aspect of the present invention is a data processing apparatus for performing processing to write file data in a second memory area of an integrated circuit having a first memory area wherein at least one of a write operation and rewrite operation of file data used for providing a first service is authorized conditional on use of first area management key data and a second memory area wherein at least one of a write operation and rewrite operation of file data used for providing a second service is authorized conditional on use of second area management key data, comprising a memory means storing third area management data and file key data which is issued by the second service provider, used at the time of writing the file data to a third memory area, and encrypted by the third area management key data when a plurality of third memory areas are defined in the second memory area, third memory management key data used for performing at least one of a write operation to a third memory area and a rewrite operation in the third memory area is defined for each of the plurality of third memory areas, and said integrated circuit stores said third area management key data; an output means for outputting the encrypted file key data to the integrated circuit; and a writing means for writing file data to be used for providing the second service to the second memory area of the integrated circuit by using the file key data.

Further, a portable unit issuing method according to a seventh aspect of the present invention comprises issuing a portable unit including an integrated circuit storing memory area division data and first area management key data and authorizing at least one of a write operation to a memory area in said integrated circuit and a rewrite operation in the memory area conditional on use of the first area management key data and requesting a memory area operation unit managing the memory area division data to divide the memory area of the integrated circuit to a first memory area wherein at least one of a write operation and re-write operation in the memory area is authorized conditional on use of the first area management key data and a second memory area wherein at least one of a write operation and a rewrite operation in the memory area is authorized conditional on use of the second area management key data by using the memory area division data.

Further, a program according to an eighth aspect of the present invention is a program for making a computer execute processing so that a portable device including an integrated circuit storing memory area division data, a system code for identifying a first service provider, and first area management key data which is authorized to perform at least one of a write operation to a memory area of said integrated circuit and a rewrite operation to the memory area conditional on the use of the first area management key data makes a second service provider provide a service using part of said memory area of said integrated circuit when issued by a first service provider providing a first service using said memory area, comprising making the computer execute a routine for receiving as input the system code from the integrated circuit; a routine for referring to a registerable system code list indicating the system code given to the first service provider which can provide a service by the same integrated circuit as the second service provider and judging whether the input system code is indicated in the registerable system code list; and a routine for outputting to the integrated circuit a module including second area management data issued by a memory area operation unit managing execution of the program and encrypted by the memory area operation unit by using the memory area division data and further encrypted by the first service provider by using the first area management key data when judging that the input system code is indicated in the registerable system code list.

Further, a data processing method according to a ninth aspect of the present invention is a data processing method for processing so that a portable device including an integrated circuit storing distribution key data, a system code for identifying a first service provider, and first area management key data which is authorized to perform at least one of a write operation to a memory area of said integrated circuit and a rewrite operation to the memory area conditional on the use of the first area management key data makes a second service provider provide a service using part of said memory area of said integrated circuit when issued by a first service provider providing a first service using said memory area, comprising a routine of inputting the system code from the integrated circuit; a routine of referring to a registerable system code list indicating the system code given to the first service provider which can provide service by the same integrated circuit as the second service provider and judging whether the input system code is indicated in the registerable system code list; and a routine of outputting to the integrated circuit a module including second area management data issued by a memory area operation unit managing execution of the program and encrypted by the memory area operation unit by using the distribution key data and further encrypted by the first service provider by using the first area management key data when it judges that the input system code is indicated in the registerable system code list.

Further, a program according to a tenth aspect of the present invention is a program for making a computer execute processing for writing file data to a second memory area of an integrated circuit having a first memory area wherein at least one of a write operation and rewrite operation of file data used for providing a first service is authorized conditional on use of first area management key data and a second memory area wherein at least one of a write operation and rewrite operation of file data used for providing a second service is authorized conditional on use of second area management key data, comprising making the computer execute a routine of outputting to the integrated circuit file key data which is issued by a second service provider, used at the time of writing the file data in a third memory area, and encrypted by a third area management data when a plurality of third memory areas are defined in the second memory area, a third memory management key data used for performing at least one of a write operation to a third memory area and a rewrite operation in the third memory area is defined for each of the plurality of third memory areas, and the integrated circuit stores the third area management key data and a routine of writing file data used for providing the second service in the second memory area of the integrated circuit by using the file key data.

Further, a data processing method according to an eleventh aspect of the present invention is a data processing method for performing processing for writing file data to a second memory area of an integrated circuit having a first memory area wherein at least one of a write operation and rewrite operation of file data used for providing a first service is authorized conditional on use of first area management key data and a second memory area wherein at least one of a write operation and rewrite operation of file data used for providing a second service is authorized conditional on use of second area management key data, comprising a routine of outputting to the integrated circuit file key data which is issued by a second service provider, used at the time of writing the file data in a third memory area, and encrypted by a third area management data when a plurality of third memory areas are defined in the second memory area, a third memory management key data used for performing at least one of a write operation of data to a third memory area and a rewrite operation of data in the third memory area is defined for each of the plurality of third memory areas, and the integrated circuit stores the third area management key data and a routine of writing file data used for providing the second service in the second memory area of the integrated circuit by using the file key data.

Additional features and advantages are described herein, and will be apparent from, the following Detailed Description and the figures.

BRIEF DESCRIPTION OF THE FIGURES

FIG. 9 is a flowchart explaining the package data generation processing of step ST1 shown in FIG. 8;

FIG. 13 is a flowchart explaining what follows the setting of the memory area division registration apparatus 14 at step ST3 shown in FIG. 8;

FIG. 14A is a view explaining an area code acquisition request;

FIG. 14B is a view explaining an apparatus code list;

FIG. 14C is a view explaining an area management code list;

FIG. 18 is a view explaining how data is stored in the operation file registration apparatus after completing step ST4 shown in FIG. 8;

FIG. 20 is a flowchart explaining memory area division processing of the IC card by the memory area division apparatus performed at step ST5 shown in FIG. 8;

FIG. 21 is a flowchart continued from FIG. 20;

FIG. 33 is a simplified diagram explaining registration processing in the IC card system shown in FIG. 26.

DETAILED DESCRIPTION

Below, the best mode for carrying out the present invention will be explained with reference to the attached drawings.

Figure 1:
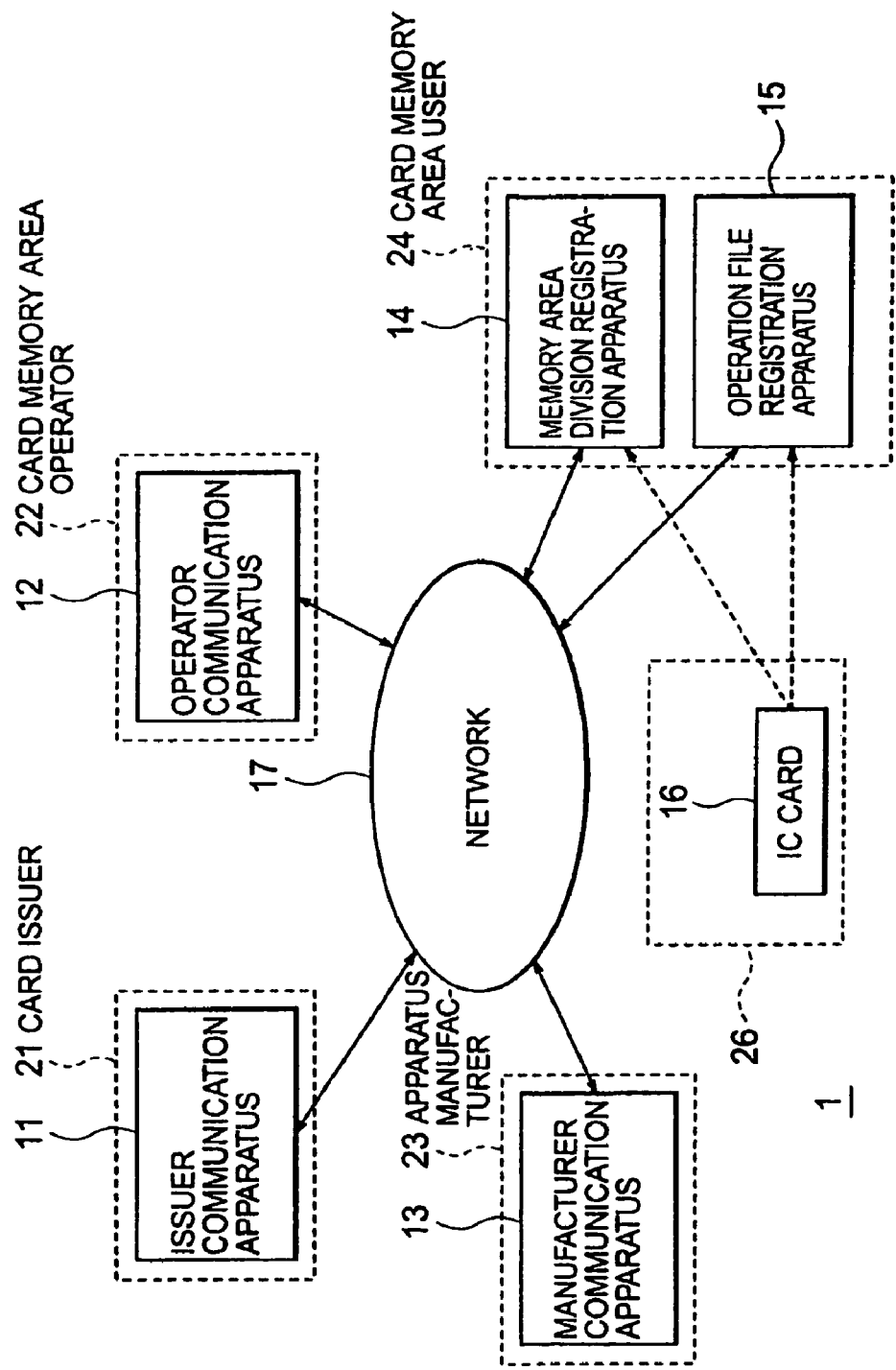
FIG. 1 is a view of the overall configuration of a communication system according to an embodiment of the present invention.

FIG. 1 is a view of the overall configuration of a communication system 1 according to an embodiment of the present invention.

As shown in FIG. 1, the communication system 1 comprises, for example, an issuer communication apparatus 11 to be used by an IC card issuer 21, an operator communication apparatus 12 to be used by a card memory area operator 22, a manufacturer communication apparatus 13 to be used by an apparatus manufacturer 23, and a memory area division registration apparatus 14 and an operation file registration apparatus 15 to be used by a card memory area user 24.

In the communication system 1, when the IC card issuer 21 issues an IC card 16 to a card holder 26, it registers file data related to the services provided by the card memory area user 24 in the IC card 16 based on predetermined conditions so that the card holder 26 can receive services from both the IC card issuer 21 and the card memory area user 24 by using a single IC card 16.

As shown in FIG. 1, in the communication system 1, the issuer communication apparatus 11, the operator communication apparatus 12, the manufacturer communication apparatus 13, the memory area division registration apparatus 14, and the operation file registration apparatus 15 are connected via a network 17.

In FIG. 1, the IC card issuer 21 issues the IC card 16 and provides its own services for the IC card 16.

The card memory area operator 22 receives a request from the IC card issuer 21 and provides the card memory area user 24 a memory area that the IC card issuer 21 does not use in the memory area of the memory (semiconductor memory) in the IC card 16 issued by the IC card issuer 21.

The apparatus manufacturer 23 receives a request from the card memory area operator 22, produces the memory area division registration apparatus 14, and delivers the same to the card memory area user 24.

The card memory area user 24 issues a request to the card memory area operator 22 and provides its own services for the memory area of the IC card 16.

The card holder 26 is issued the IC card 16 by the IC card issuer 21 and receives the services provided by the IC card issuer 21. When the card holder 26 wants to receive services provided by the card memory area user 24 after the issuance of the IC card 16, it is possible to store file data related to the services of the card memory area user 24 in the IC card 16. The file data is stored by using the memory area division registration apparatus 14 and the operation file registration apparatus 15 to receive the services of the card memory area user 24.

Because the single IC card 16 includes the services of the IC card issuer 21 and the card memory area user 24, the communication system 1 is configured so that it is difficult for an unauthorized person to illicitly write and rewrite data in a memory area where the file data related to the services of the IC card issuer 21 and the card memory area user 24 is stored.

Note that in FIG. 1, there is only one IC card issuer 21, card memory area user 24, and card holder 26 shown in the example. The present invention, however, can be used with one or more IC card issuer 21, card memory area user 24, and card holder 26.

Also, the correspondence of the components of the present embodiment and the components of the claims is, for example, that the IC card issuer 21 and the issuer communication apparatus 11 correspond to the first service provider of the present invention. Furthermore, the card memory area user 24 corresponds to the second service provider of the present invention. The operator communication apparatus 12 and the card memory area operator 22 correspond to the memory area operator of the present invention.

Also, the area management key data K_AM_(i) corresponds to the first area management key data of the present invention and the area management key data K_AM_F corresponds to the second area management key data of the present invention.

Furthermore, the IC card 16 corresponds to the portable device provided with an integrated circuit of the present invention.

Note that in the present embodiment, the IC card 16 is shown as an example of the portable device of the present invention. However, the portable device of the present invention may also be a portable telephone device, portable information terminal apparatus, or other similar devices, provided with an IC (integrated circuit).

Also, package data Pf corresponds to the first module of the present invention, while package data Pj corresponds to the second module of the present invention.

Also, an uppermost area AREA_MU_(i) corresponds to a first memory area of the present invention, while an uppermost area AREA_MU_F corresponds to a second area memory area of the present invention. Also, a lower layer of the area AREA of the uppermost area AREA_MU_F corresponds to the third memory area of the present invention.

First, the components of the communication system 1 shown in FIG. 1 will be explained.

Figure 2:
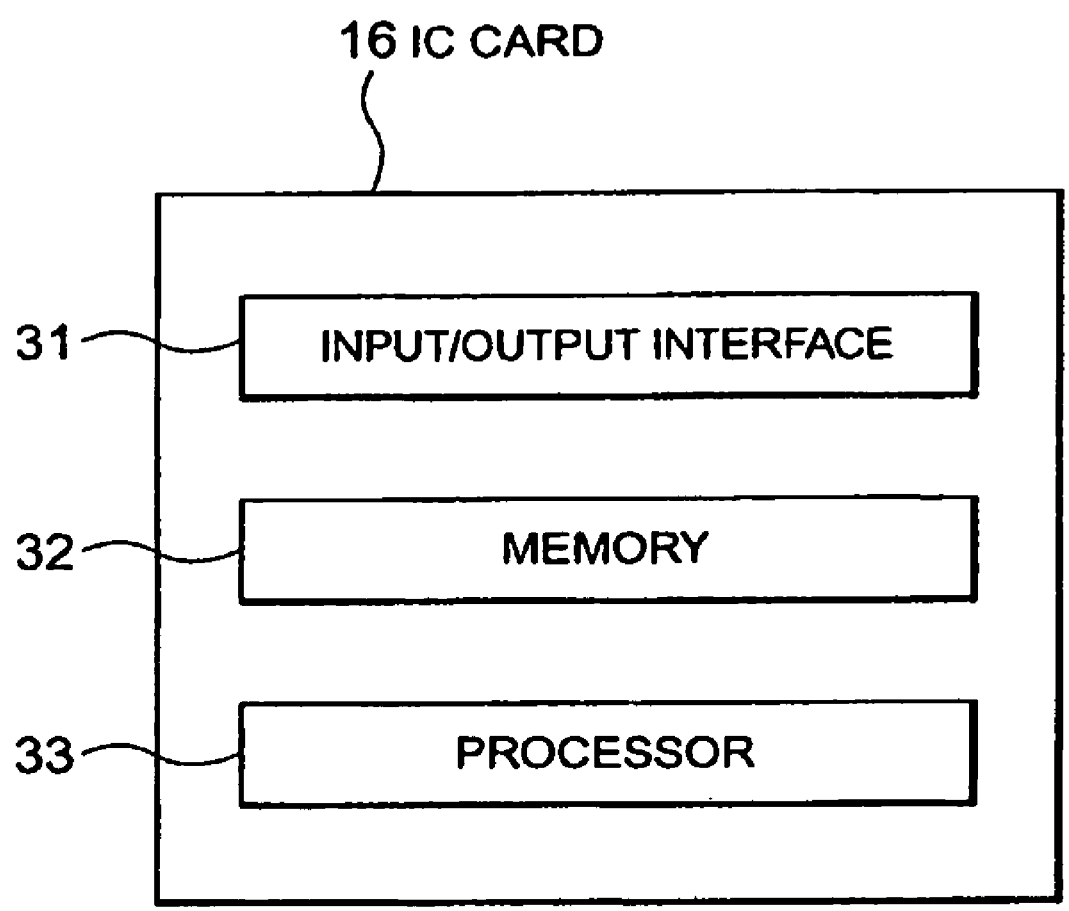
FIG. 2 is a block diagram showing the functions of the IC card shown in FIG. 1.

Referring to FIG. 2, a block diagram shows the functions of the IC card 16 of FIG. 1.

In FIG. 2, the IC card 16 comprises, for example, an input/output interface 31, a memory 32, and a processor 33.

The input/output interface 31 is an interface for inputting/outputting data and requests by a non-contact method or a contact method between the memory area division registration apparatus 14 and the operation file registration apparatus 15 when mounted in the memory area division registration apparatus 14 and the operation file registration apparatus 15, respectively.

The memory 32 is for example a semiconductor memory which stores data related to services provided by the IC card issuer 21, the card memory area user 24 and data related to an operation by the card memory area operator 22 as discussed below.

The processor 33 performs processing related to the functions of the IC card 16.

Figure 3:
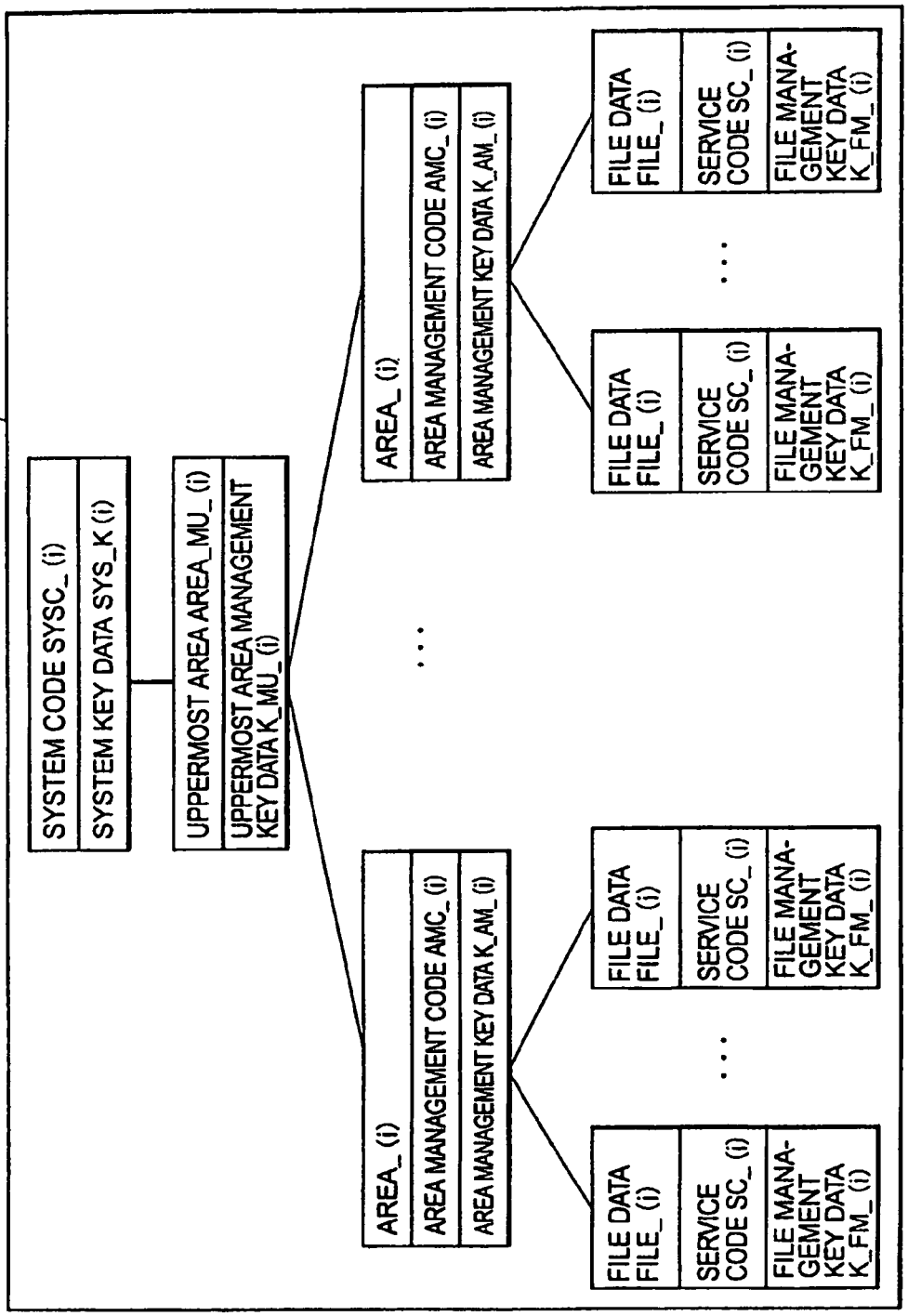
FIG. 3 is a block diagram explaining how data is stored in a memory of the IC card shown in FIG. 2 after issuance by an IC card issuer and before processing by a card memory area operator 22.

FIG. 3, is a view explaining how data is stored in the memory 32 of the IC card 16 shown in FIG. 2 after the issuance of the IC card 16 by the IC card issuer 21, and before operation processing by the card memory area operator 22.

As shown in FIG. 3, the memory 32 stores a system code SYSC_(i) assigned to the IC card issuer 21 and system key data SYS_K_(i) linked with the system code SYSC_(i).

Also, as shown in FIG. 3, the memory 32 for example has a hierarchical structure wherein the uppermost memory area AREA_MU_(i) is the uppermost layer and a plurality of areas AREA_(i) are defined as lower layers thereof. An area AREA_(i) may be furthermore defined as a lower layer of the area AREA shown in FIG. 3.

The uppermost area management key data K_MU_(i) is assigned to the uppermost memory area AREA_MU_(i).

The areas AREA_(i) are assigned the area management code AMC_(i) and area management key data K_AM_(i).

Also, a plurality of file data FILE_(i) for performing processing related to services provided by the IC card issuer 21 are set (stored) in the area AREA_(i).

Also, in correspondence to the file data FILE_(i), the memory 32 stores service codes SC_(i) assigned to services provided by using the file data and file management key data K_FM_(i) used for setting the file data FILE_(i).

Figure 4:
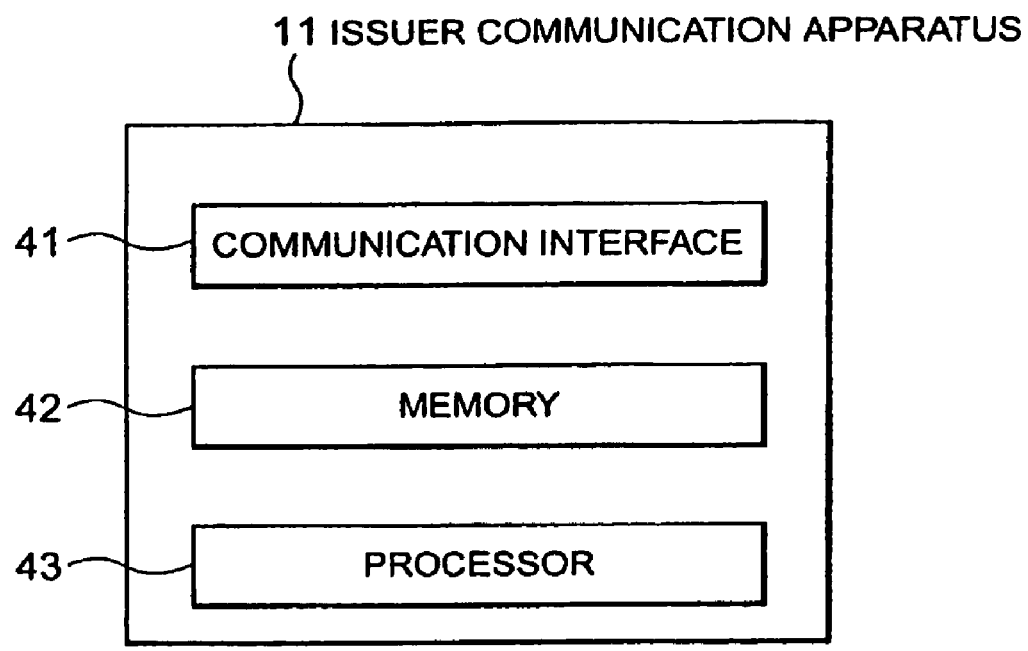
FIG. 4 is a block diagram showing the functions of an issuer communication apparatus 11 shown in FIG. 1.

Referring to FIG. 4, a block diagram shows the functions of the issuer communication apparatus 11 of FIG. 1.

As shown in FIG. 4, the issuer communication apparatus 11 comprises for example a communication interface 41, a memory 42, and a processor 43.

The issuer communication apparatus 11, as shown in FIG. 3, performs processing for encrypting the package data Pf received from the operation communication apparatus 12 by using the system key data SYS_K_(i) stored in the memory 32 of the IC card 16 in a secured state (secret state) so as to generate the package data Pj as will be explained later.

Note that the system key data SYS_K_(i) is known only by the IC card issuer 21 and kept secret from the card memory area operator 22, the apparatus manufacturer 23, and the card memory area user 24 shown in FIG. 1.

The communication interface 41 is an interface for sending/receiving data with the operation communication apparatus 12 via the network 17.

The memory 42 stores the data shown in FIG. 3, which is stored in the IC card 16 issued by the IC card issuer 21.

The processor 43 performs processing operations (generation of Pj) related to the lending of the memory 32 with the operation communication apparatus 12 as will be explained later.

Figure 5:
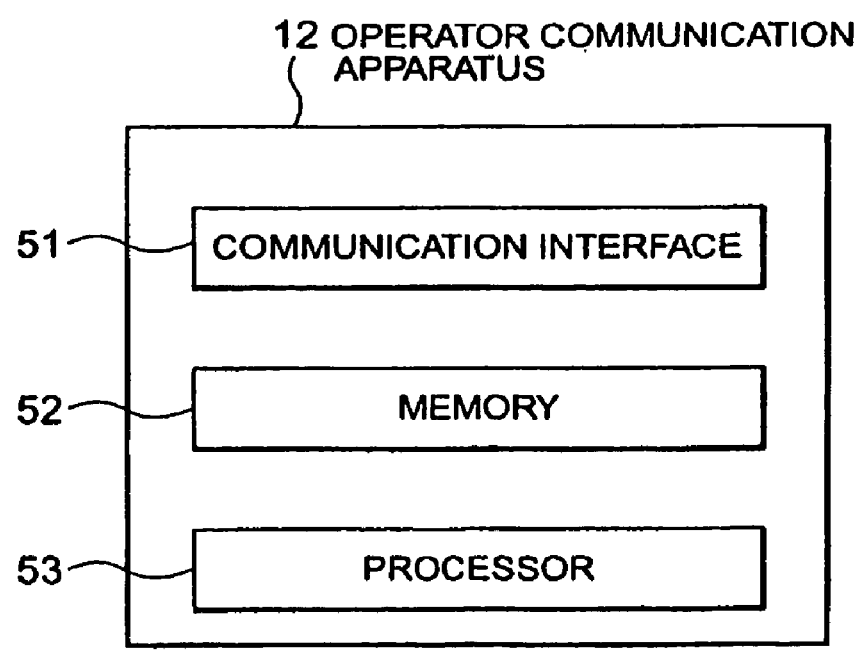
FIG. 5 is a block diagram showing the functions of an operator communication apparatus 12 shown in FIG. 1.

Referring to FIG. 5, a block diagram shows the functions of the operator communication apparatus 12 of FIG. 1.

As shown in FIG. 5, the operator communication apparatus 12 comprises, for example, a communication interface 51, a memory 52, and a processor 53.

The operator communication apparatus 12 manages a variety of processing for lending a memory area of the memory 32 of the IC card 16 to the card memory area user 24.

The communication interface 51 is an interface for sending/receiving data between the issuer communication apparatus 11, the memory area division registration apparatus 14, and the operation file registration apparatus 15 via the network 17.

The memory 52 stores a system code SYSC_F related to a new memory area to be formed by dividing the memory area of the memory 32 and system key data SYS_K_F corresponding to the system code SYSC_F etc. Also, the memory 52 stores division key data K_D.

The processor 53 performs various processing operations for lending a memory area of the memory 32 to the card memory area user 24 as will be explained later.

Figure 6:
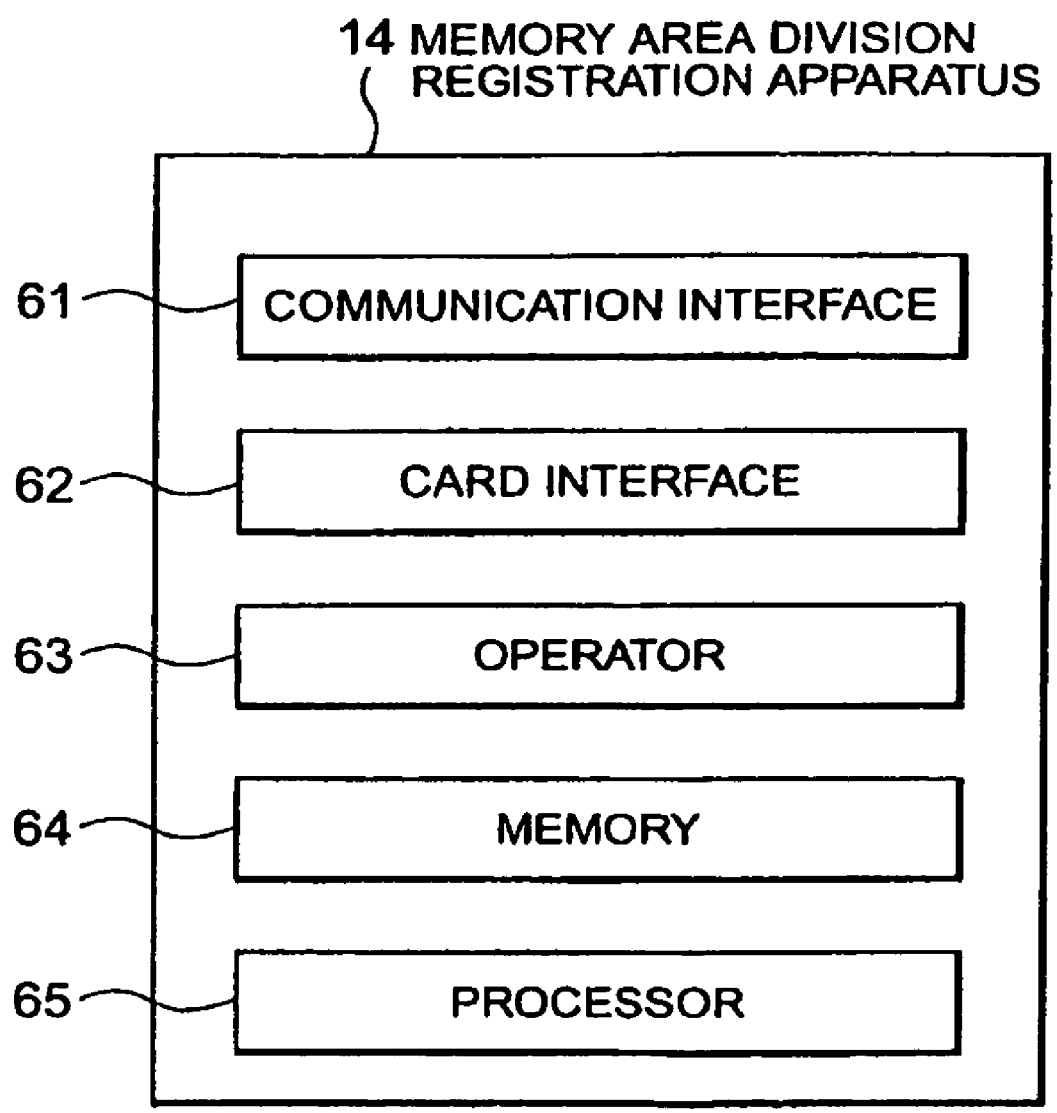
FIG. 6 is a block diagram of the functions of a memory area division registration apparatus 14 shown in FIG. 1.

Referring to FIG. 6, a block diagram shows the functions of the memory area division registration apparatus 14 of FIG. 1.

The memory area division registration apparatus 14 is for example provided to a store etc. of the card memory area user 24. Note that the memory area division registration apparatus 14 may also be provided at a store or similar location of the operator communication apparatus 12.

Also, the memory area division registration apparatus 14 is produced by the apparatus manufacturer 23 and delivered to the card memory area user 24.

As shown in FIG. 6, the memory area division registration apparatus 14, for example, comprises a communication interface 61, a card interface 62, an operator 63, a memory 64, and a processor 65.

The communication interface 61 is an interface for sending/receiving data with the operator communication apparatus 12 via the network 17.

The card interface 62 is an interface connected to the input/output interface 31 of the IC card 16 shown in FIG. 2 which inputs/outputs data and requests from/to the input/output interface 31 when the IC card 16 is mounted in the memory area division registration apparatus 14.

The operator 63 is used, for example, when the card holder 26, who visited a store of the card memory area user 24, inputs an instruction.

The memory 64 stores data required for processing of the processor 65.

The processor 65 performs processing for dividing the memory area of memory 32 to form a memory area for writing file data related to the services of the card memory area user 24.

Figure 7:
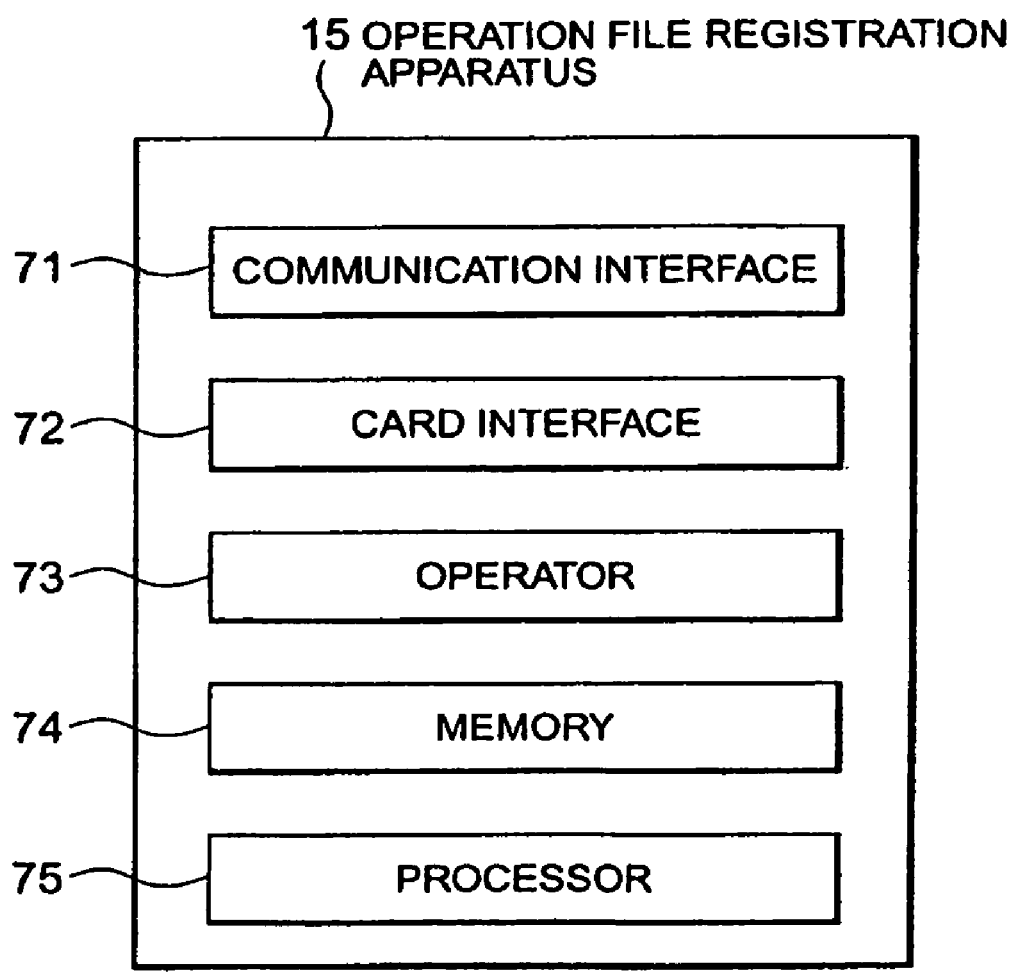
FIG. 7 is a block diagram showing the functions of an operation file registration apparatus 15 shown in FIG. 1.

Referring to FIG. 7, a block diagram shows the functions of the operation file registration apparatus 15 of FIG. 1.

The operation file registration apparatus 15 is, for example, provided at a store or similar location of the card memory area user 24.

As shown in FIG. 7, the memory area division registration apparatus 14 for example comprises a communication interface 71, a card interface 72, an operator 73, a memory 74, and a processor 75.

The communication interface 71 is an interface for sending/receiving data with the operator communication apparatus 12 via the network 17.

The card interface 72 is an interface connected to the input/output interface 31 of the IC card 16 shown in FIG. 2 which inputs/outputs data and requests to/from the input/output interface 31 when the IC card 16 is mounted in the operation file registration apparatus 15.

The operator 73 is used by a card holder 26, who visits a store of the card memory area user 24, to input an instruction.

The memory 74 stores data required for processing of the processor 75.

The processor 75 performs processing for writing file data, related to the services provided by the memory area division registration apparatus 14, in the memory area divided by the above memory area division registration apparatus 14.

Below, an example of the operation of the communication system 1 shown in FIG. 1 will be explained.

First, an outline of the overall operation of the communication system shown in FIG. 1 will be explained.

Figure 8:
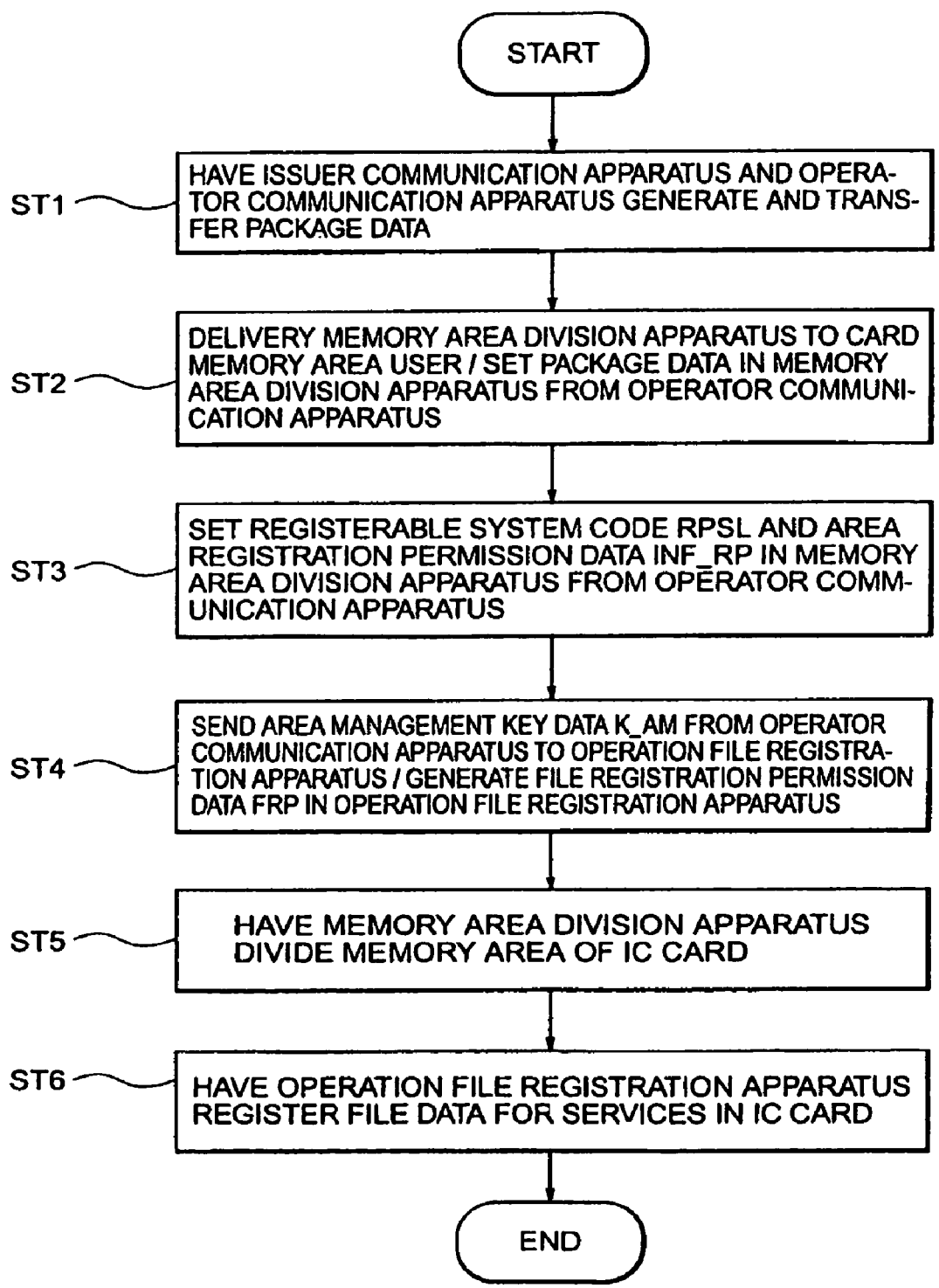
FIG. 8 is a flowchart explaining the overall operation of the communication system shown in FIG. 1.

FIG. 8 is a flowchart for explaining the overall operation of the communication system 1 shown in FIG. 1.

Step ST1

The operator communication apparatus 12 generates package data Pf including a system code SYSC_F used at the time of dividing the memory area of the memory 32 of the IC card 16 and uppermost area management key data K_MU_F. encrypts it by division key data K_D and sends it. The issuer communication apparatus 11 encrypts the package data Pf by using the system key data SYS_K_(i) to generate package data Pj, which is sent to the operator communication apparatus 12.

The package data Pj is held by the operator communication apparatus 12.

Step ST2

The memory area division registration apparatus 14 is delivered from the apparatus manufacturer 23 to the card memory area user 24.

Also, the system code SYSC_(i) and the package data Pj, etc. are sent from the operator communication apparatus 12 to the memory area division registration apparatus 14 and stored in the memory area division registration apparatus 14.

Step ST3

A registerable system code list RPSL and area registration permission data INF_ARP are sent from the operator communication apparatus 12 to the memory area division registration apparatus 14 and stored in the memory area division registration apparatus 14.

The registerable system code list RPSL includes a system code of the IC card 16 to which file data of services related to the card memory area user 24 can be registered by using the memory area division registration apparatus 14.

The area registration permission data INF_ARP is used for registering an area AREA_F defined in a new memory area obtained by dividing the memory area of the IC card 16.

Step ST4

The area management key data K_QM_F is provided by a secured path from the operator communication apparatus 12 to the operation file registration apparatus 15.

Here, the area management data K_AM_F is used at the time of writing file data in one or more areas AREA_F defined in the new memory area formed by dividing the memory area of the IC card 16.

Also, file registration permission data FRP is generated in the operation file registration apparatus 15.

Step ST5

For example, when the card holder 26 loads the IC card 16 in the memory area division registration apparatus 14, the memory area division apparatus divides the memory area of the memory 32 of the IC card 16 by performing predetermined processing to define a memory area used by the IC card issuer 21 (the uppermost area AREA_MU_(i) shown in FIG. 3) and a new memory area used by the card memory area user 24 (the uppermost area management key data area_MU_F).

Step ST6

When the card holder loads the IC card 16 in the operation file registration apparatus 15, file data related to the service provider provided by the card memory area user 24 is written by using the file registration permission data FRP into the new memory area defined at step ST5.

As a result, the card holder 26 can receive services from both the IC card issuer 21 and the card memory area user 24 by using a single IC card 16.

Below, each of the steps shown in FIG. 8 will be explained in detail by using a flowchart.

First, package data generation processing of the step ST1 shown in FIG. 8 will be explained.

FIG. 9 is a flowchart for explaining the processing.

Step ST21

Figure 10A:
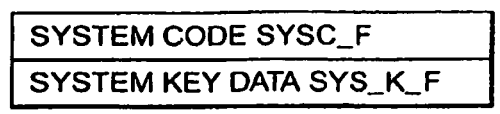
FIG. 10A, FIG. 10B, and FIG. 10C are views explaining package data Pf and Pj.

The processor 53 of the operator communication apparatus 12 shown in FIG. 1 and FIG. 5, as shown in FIG. 10A, divides the memory area of the memory 32 and generates the package data Pf including the system code SYSC_F of the uppermost area AREA_MU_F and the corresponding system key data SYS_K_F.

Step ST22

Figure 10B:
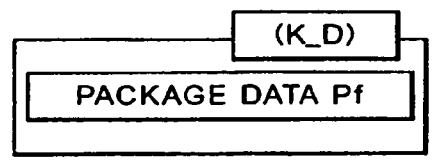

The processor 53 of the operator communication apparatus 12, as shown in FIG. 10B, encrypts the package data Pf generated at step ST1 by using division key data K_D read from the memory 52.

Step ST23

The package data Pf generated at step ST22 is sent to the issuer communication apparatus 11 via the communication interface 51 of the operator communication apparatus 12 and the network 17.

The package data Pf is received by the communication interface 41 of the issuer communication apparatus 11 shown in FIG. 4.

Step ST24

The processor 43 of the operator communication apparatus 11 shown in FIG. 4 generates the package data Pj. The package data Pj includes the division block number data for defining a memory capacity of the memory area requested to be operated by (lent to) the card memory area operator 22 in memory 32 and the package data Pf received at step ST23.

Step ST25

The processor 43 of the issuer communication apparatus 11 encrypts the package data Pj generated at step ST24 by the uppermost area management key data K_MU_(i) read from the memory 42.

Step ST26

The processor 43 of the issuer communication apparatus 11 sends to the operator communication apparatus 12 the system code SYSC_(i), rejection information RI_(i), and the package data Pj encrypted at step ST25 via the communication interface 41 and the network 17.

These are received by the communication interface 51 of the operator communication apparatus 12 shown in FIG. 5.

Here, the rejection information RI_(i) is the information that specified which parties services are rejected by the IC card issuer 21 when using the same IC card 16.

Step ST27

The processor 53 of the operator communication apparatus 12 shown in FIG. 5 writes in the memory 52 the system code SYSC_(i), the rejection information RI_(i), and the encrypted package data Pj received at step ST26.

Next, delivery and setting of the memory area division registration apparatus 14 at step ST2 shown in FIG. 8 will be explained.

Figure 11:
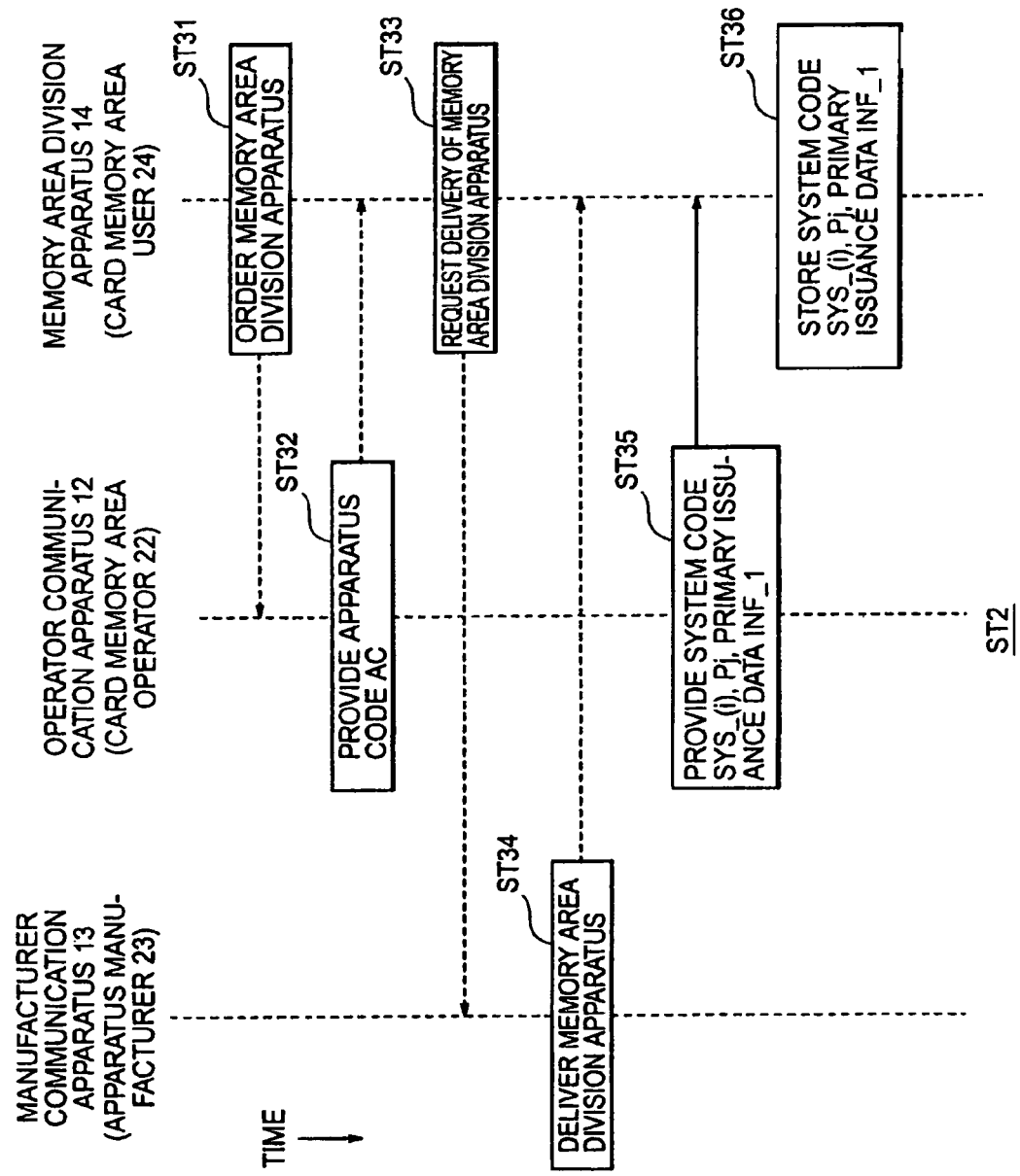
FIG. 11 is a flowchart explaining the delivery and setting of a memory area division apparatus at step ST2 shown in FIG. 8.

FIG. 11 is a flowchart for explaining the processing.

Step ST31

The card memory area user 24 orders the memory area division registration apparatus 14 from the card memory area operator 22.

Step ST32

When the card memory area operator 22 receives the order at step ST31, it issues an apparatus code AC (registration machine code) to the memory area division registration apparatus 14 to be delivered to the card memory area user 24 and notifies the card memory area user 24 of same.

Step ST33

The card memory area user 24 uses the apparatus code AC notified at step ST32 to request delivery of the memory area division registration apparatus 14 to the apparatus manufacturer.

The above steps ST31 to ST33 are performed by using a personal computer of the card memory area user 24, telephone, and mail.

Step ST34

The apparatus manufacturer 23 inquires about the legitimacy of the apparatus code AC to the card memory area operator 22 when needed in accordance with the delivery request received at step ST33 and delivers the memory area division registration apparatus 14, storing the apparatus code AC, to the card memory area user 24.

Step ST35

When the card memory area operator 22 receives, for example, a delivery completion notice of the memory area division registration apparatus 14 from the card memory area user 24, it reads the system code SYSC_(i), the encrypted package data Pj, and first issuance data INF_1 from the memory 52 under the control of the processor 53 of the operator communication apparatus 12 shown in FIG. 5 and sends the same to the memory area division registration apparatus 14 via the communication interface 51 and the network 17.

The data is received by the communication interface 61 of the memory area division registration apparatus 14 shown in FIG. 6.

Figure 12:
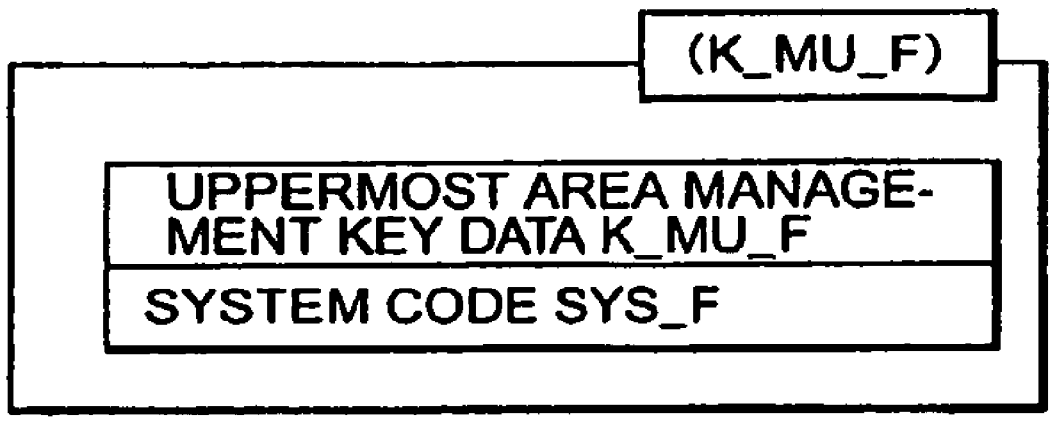
FIG. 12 is a view explaining first issued data.

Here, the first issuance data INF_1 is, for example, as shown in FIG. 12, data obtained by encrypting module data including the uppermost area management data K_MU_F and the system code SYSC_F by the upper most area management key data K_MU_F.

Step ST36

The processor 65 of the memory area division registration apparatus 14 shown in FIG. 6 writes in the memory 64 the system code SYSC_(i), the encrypted package data Pj, and the first issuance data information INF_1 received at step ST35.

Next, a continuation of the setting of the memory area division registration apparatus 14 at step ST3 in FIG. 8 will be explained.

FIG. 13 is a flowchart for explaining the processing.

Step ST41

The card memory area user 24 operates the operator 63 of the memory area division registration apparatus 14 shown in FIG. 14 to input an area management code acquisition instruction. Due to this, an area management code acquisition request REQ_AMC shown in FIG. 14A is sent to the operator communication apparatus 12 via the communication interface 61 and the network 17.

The area management code acquisition request is received by the communication interface 51 of the operator communication apparatus 12 shown in FIG. 5.

As shown in FIG. 14A, the area management code acquisition request REQ_AMC indicates the apparatus code AC, rejection information RI_F, number of registration areas, number of blocks of each of the registration areas, and number of service codes.

Here, the apparatus code AC is notified to the card memory area user 24 from the card memory area operator 22 at step ST32 shown in FIG. 11.

The rejection information RI_F is the information for specifying a party for which provision of services using the same IC card 16 is rejected by the IC card issuer 21.

The number of registration areas is the number of areas AREA_F that the card memory area user 24 desires to use for storing file data relating to its own services and is defined after division of the memory 32 of the IC card 16.

The number of blocks of each of the registration areas is the number of blocks assigned to the area, AREA.

The number of service codes is the number of service codes which the card memory area user 24 desires to use for storing file data relating to its own services.

Step ST42

When the processor 53 of the operator communication apparatus 12 shown in FIG. 5 receives the area management code acquisition request at step ST41, it generates an apparatus code list MCL and an area management code list ACL and stores the same in the memory 52.

The apparatus code list ACL indicates, as shown in FIG. 14B, the apparatus code AC assigned to the memory area division registration apparatus 14, the area management code AMC_F (application code) assigned to one or more areas AREA defined in the memory management area divided by the memory area division registration apparatus 14, and the rejection information RI_F received at step ST41 in correspondence.

Furthermore, the area management code list AMCL is, as shown in FIG. 14C, generated for every area management code AMC_F (application code) indicated by the apparatus code list ACL in FIG. 14B and indicates the area management code AMC_F (application key), the area management key data K_AM_F corresponding to the corresponding area AREA_F, and file data written in the area, AREA_F.

Step ST43

The processor 53 of the operator communication apparatus 12 shown in FIG. 5 uses the same IC card 16 as that of the card memory area user 24 to specify the IC card issuer 21, which can provide services based on the rejection information RI_(i) stored in the memory 52 at step ST27 shown in FIG. 9 and the rejection information RI_F stored at step ST41.

Step ST44

The processor 53 of the operator communication apparatus 12 uses the system code assigned to the IC card issuer 21 specified at step ST43 to generate a registerable system code list RPSL.

Figure 15A:
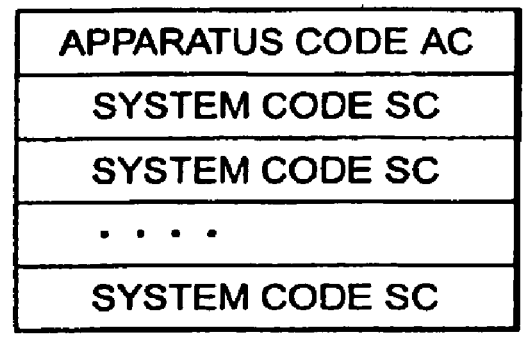
FIG. 15A is a view explaining a registerable system code list.

The registerable system code list RPSL indicates, as shown in FIG. 15A, the apparatus code AC assigned to the memory area division registration apparatus 14 and the system code SC assigned to one or more IC card issuers 21 specified at step ST43 in correspondence.

Step ST45

The processor 53 of the operator communication apparatus 12 encrypts the area management code list AMCL generated at step ST42 and shown in FIG. 14C by the uppermost area management key data K_MU_F to generate area registration permission data INF_ARP.

Step ST46

The processor 53 of the operator communication apparatus 12 sends the registerable system code list RPSL and the area registration permission data INF_ARP generated at step ST45 to the memory area division registration apparatus 14 via the communication interface 51 and the network 17.

These are received by the communication interface 61 of the memory area division registration apparatus 14 shown in FIG. 6.

Step ST47

The processor 65 of the memory area division registration apparatus 14 shown in FIG. 6 stores the registerable system code list RPSL and the area registration permission data INF_ARP received at step ST46 in the memory 64.

Figure 10C:
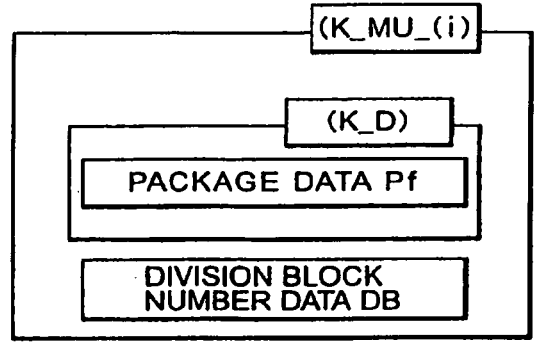
Figure 15B:
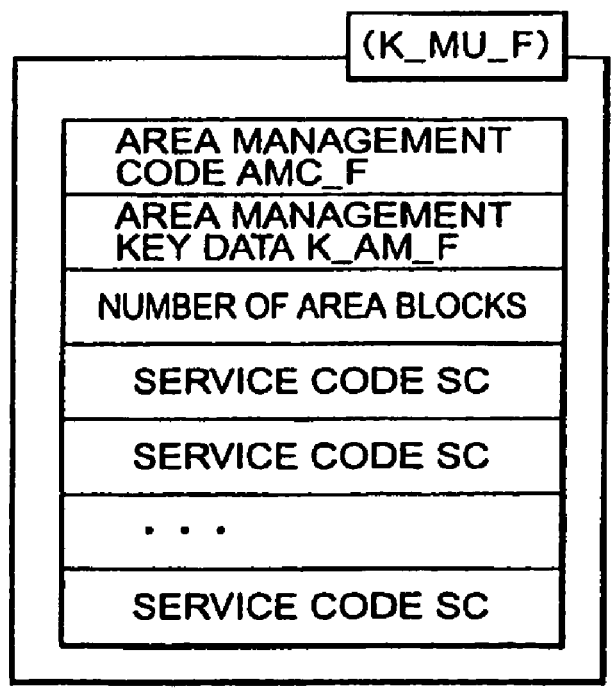
FIG. 15B is a view explaining area registration permission data.
Figure 16:
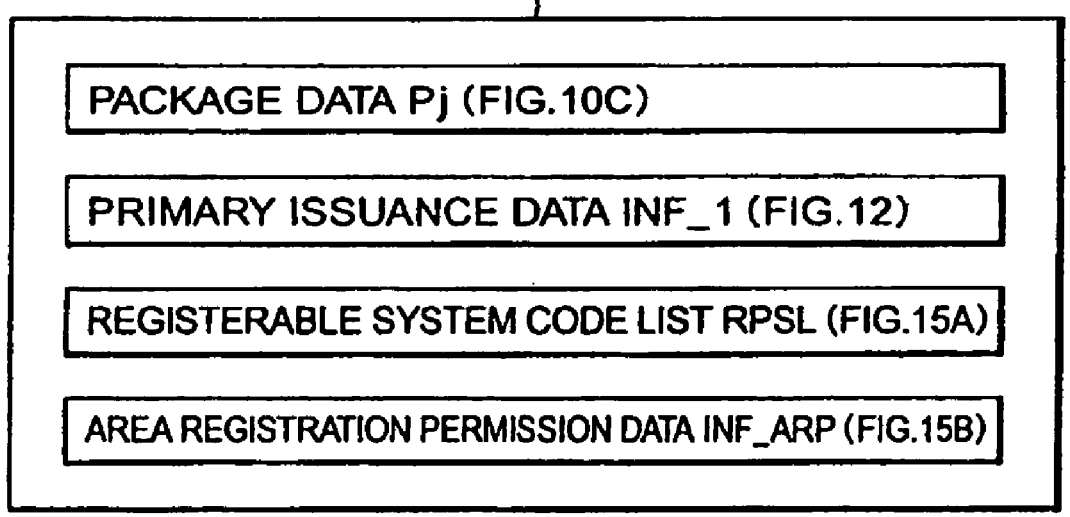
FIG. 16 is a view explaining data stored in the memory of the memory area division apparatus after completing step ST3 shown in FIG. 8.

At the stage of completing the above steps up to the step ST3 shown in FIG. 8, the memory 64 of the memory area division registration apparatus 14 stores, as shown in FIG. 16, the encrypted package data Pj shown in FIG. 10C, the encrypted first issuance data INF_1 shown in FIG. 16, the registerable system code list RPSL shown in FIG. 15A, and the encrypted area registration permission data INF_ARP shown in FIG. 15B.

Next, a continuation of the setting of the operation file registration apparatus 15 of step ST4 shown in FIG. 8 will be explained.

Figure 17:
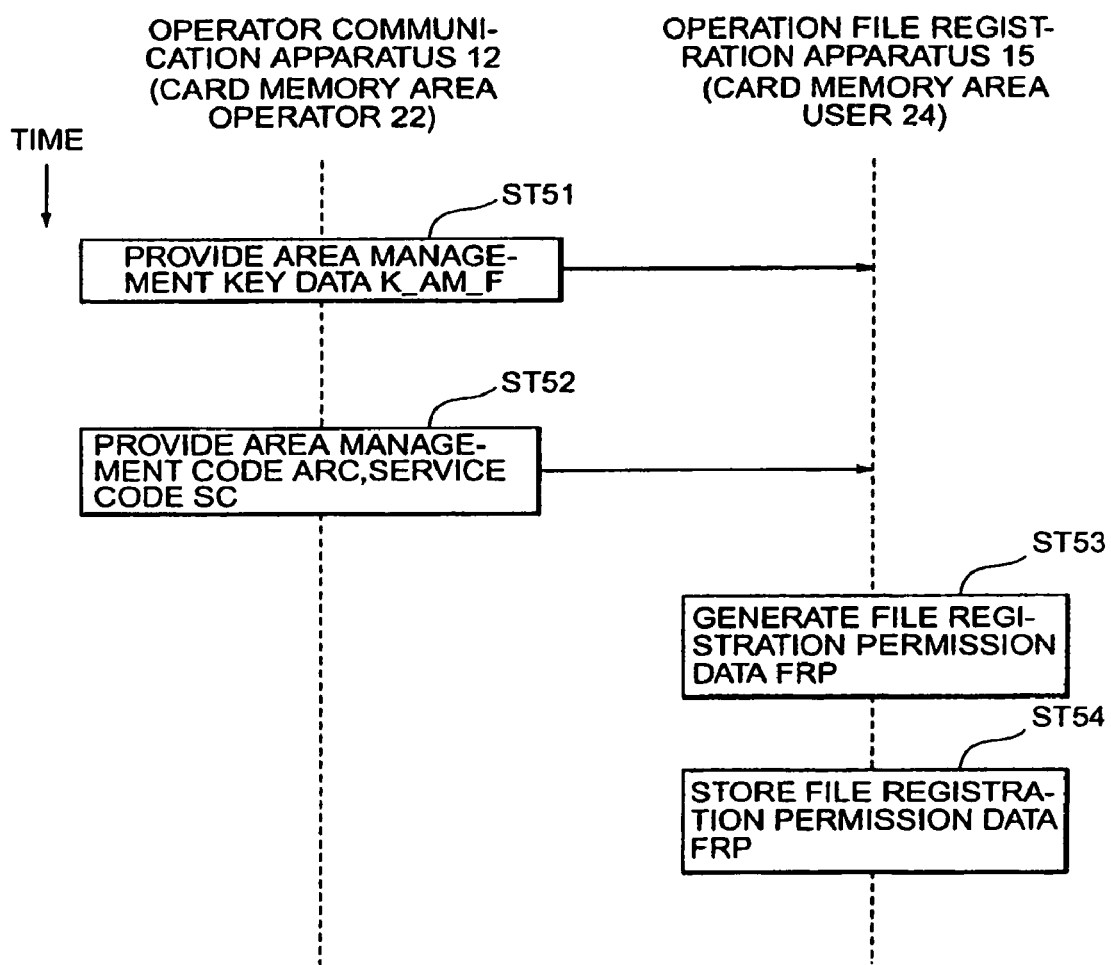
FIG. 17 is a view explaining what follows the setting of an operation file registration apparatus at step ST4 shown in FIG. 8.

FIG. 17 is a flowchart for explaining the processing.

Step ST51

The processor 53 of the operator communication apparatus 12 shown in FIG. 5 sends the area management key data K_AM_F issued at the time of generating the apparatus code list ACL at step ST42 shown in FIG. 13 via the communication interface 51 and the network 17 to the operation file registration apparatus 15 or uses other means to notify the card memory area user 24.

Step ST52

The processor 53 of the operator communication apparatus 12 sends the area management code AMC_F issued at the time of generating the above apparatus code list ACL and the service code SC via the communication interface 51 and the network 17 to the operation file registration apparatus 15.

Step ST53

Figure 19A:
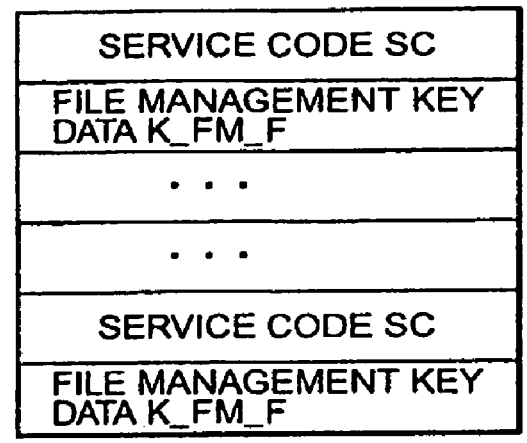
FIG. 19A and FIG. 19B are views explaining file registration permission data.

The processor 53 of the operator communication apparatus 12 shown in FIG. 7 generates, as shown in FIG. 19A, the file registration permission data FRP indicating the service codes SC and the file management key data K_FM_F determined by the card memory area user 24 in accordance with the service code SC for one or more the service codes SC received at step ST52.

Step ST54

Figure 19B:
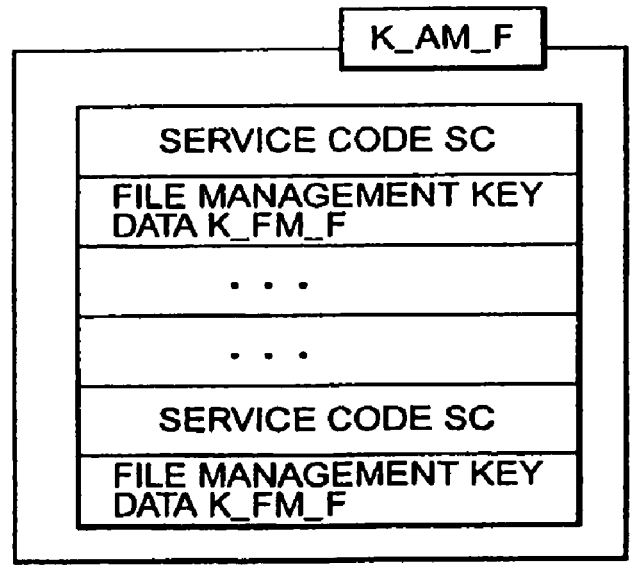

The processor 53 of the operator communication apparatus 12 shown in FIG. 7 encrypts the file registration permission data FRP generated at step ST53 by using the area management key data K_AM_F received at step ST51 and stores the same in the memory 52 as shown in FIG. 19B.

At the stage of completing the above processing up to the step ST4 shown in FIG. 8, the memory 52 of the operation file registration apparatus 15 stores, as shown in FIG. 18, the area management code AMC_F, the area management key data K_AM_F, and the encrypted file registration permission data FRP shown in FIG. 19B.

Next, the memory area division processing of the IC card 16 by the memory area division registration apparatus 14 performed at step ST5 shown in FIG. 8 will be explained.

FIG. 20 and FIG. 21 are flowcharts for explaining the processing.

Step ST61

The IC card holder 26 visits a store of the card memory area user 24 carrying the IC card 16 and loads the IC card 16 in the memory area division registration apparatus 14.

Subsequently, the system code SYSC_(i) stored in the memory 32 of the IC card 16 is read and output to the memory area division registration apparatus 14 via the input/output interface 31.

The system code SYSC_(i) is input to the card interface 62 of the memory area division registration apparatus 14 shown in FIG. 6.

Step ST62

The processor 65 of the memory area division registration apparatus 14 shown in FIG. 6 reads from the memory 64 the package data Pj and the first issuance data INF_1 corresponding to the system code SYSC_(i) input at step ST61.

Step ST63

The processor 65 of the memory area division registration apparatus 14 outputs to the IC card 16 the encrypted package data Pj and first issuance data INF_1 read at step ST62 via the card interface 62.

Step ST64

The processor 33 of the IC card 16 shown in FIG. 2 first uses the uppermost area management key data K_MU_(i) to decrypt the package data Pj input at step ST62 to obtain division condition information included in the package data Pj and the encrypted package data Pf.

Next, the processor 33 uses the division key data K_D to decrypt the package data Pf to obtain the system key data SYS_K_F and the uppermost area management key data K_MU_F included in the package data Pf.

Step ST65

The processor 33 of the IC card 16 encrypts by using the system key data SYS_K_F and the uppermost area management key data K_MU_F to generate degenerate key data K_A1, performs mutual authentication with the memory area division registration apparatus 14 by using the degenerate key data K_A1, and proceeds to the processing of step ST66 when both of the IC card 16 and the memory area division registration apparatus 14 confirm the legitimacy of each other.

In the above mutual authentication, for example, the memory area division registration apparatus 14 encrypts by using the system key data SYS_K_F and the uppermost area management key data K_MU_F to generate degenerate key data K_A2. Then, the memory area division registration apparatus 14 generates a random number R1 and encrypts the random number R1 by using the degenerate key data K_A2 to generate data R1a. Then, the memory area division registration apparatus 14 outputs the random number R1 and the data R1a to the IC card 16. The IC card 16 verifies whether the data obtained by decrypting the data R1a using the degradation data K_A1 matches with the random number R1 and, when it matches, certifies that the memory area division registration apparatus 14 is the legitimate party. Also, by processing data using the random number generated by the IC card 16, the memory area division registration apparatus 14 certifies that the IC card 16 is the legitimate party.

Step ST66

Figure 22:
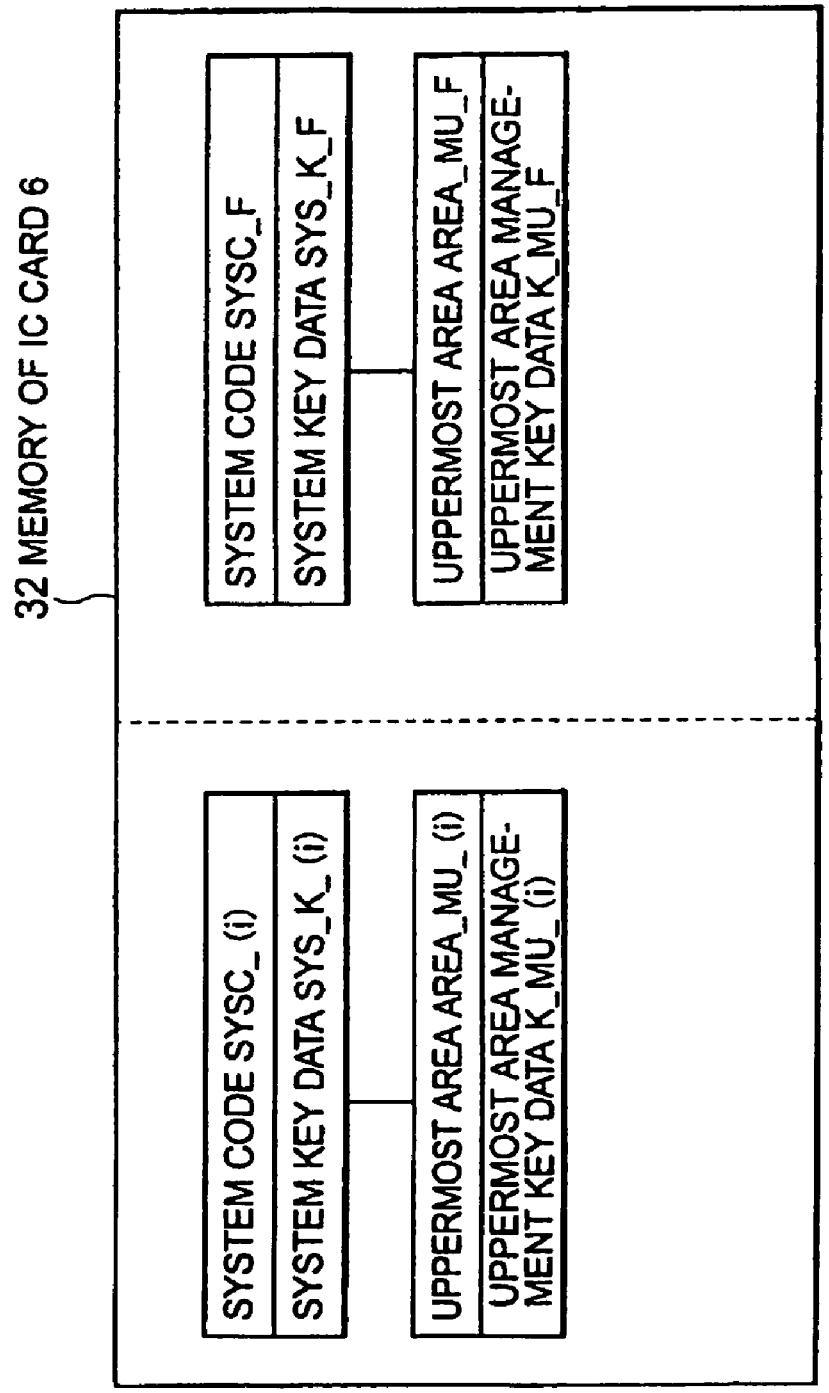
FIG. 22 is a view explaining a state after dividing the memory area of the IC card.

The processor 33 of the IC card 16 shown in FIG. 2 divides the memory area of the memory 32 and, as shown in FIG. 22, forms the uppermost area AREA_Mu_(i) assigned to the IC card issuer 21 and the uppermost area AREA_MU_F assigned to the card memory area user 24.

Step ST67

The processor 33 of the IC card 16 stores (sets) the uppermost area management key data K_MU_F in correspondence with the uppermost area AREA_MU_F of the memory 32.

Step ST68

The processor 33 of the IC card 16 uses the uppermost area management key data K_MU_F, stored at step ST67, to decrypt the first issuance data INF_1 shown in FIG. 12 and input at step ST63.

Step ST69

The processor 33 of the IC card 16 stores in the memory 32 the system code SYSC_F included in the first issuance data INF_1 obtained by decrypting the data at step ST68.

Step ST70

The processor 65 of the memory area division registration apparatus 14 judges whether the system code SYSC_(i) received from the IC card 16 at step ST61 in FIG. 2 is included in the registerable system code list RPSL shown in FIG. 15A stored in the memory 64 at step ST47 in FIG. 13. If the system code is included, the processor 65 judges whether the data related to the services provided by the card memory area user 24 can be registered in the IC card 16 and proceeds to the processing step ST71.

In the communication system 1, as explained at steps ST43 and ST44, based on the rejection information RI_(i) and the rejection information RI_F, an IC card issuer 21 is capable of providing services by using the same IC card 16 as that of the card memory area user 24 to generate the registerable system code list RPSL.

As a result, the IC card issuer 21 and the card memory area user 24 can exclude an undesirable party from providing services by using the same IC card 16.

Step ST71

The processor 65 of the memory area division registration apparatus 14, which can be registered at step ST70, outputs to the IC card 16 the encrypted area registration permission data INF_ARP shown in FIG. 15 stored in the memory 64 at step ST47 in FIG. 13 via the card interface 62.

The IC card 16 receives as input data, the encrypted area registration permission data INF_ARP via the input/output interface 31 shown in FIG. 2.

As explained above, the area registration permission data INF_ARP is encrypted by the uppermost area AREA_MU_F.

Step ST72

The processor 33 of the IC card 16 shown in FIG. 2 decrypts the encrypted area registration permission information INF_RP input via the input/output interface 31 at step ST71 by using the uppermost area management key data K_MU_F read from the memory 64.

Step ST73

Figure 23:
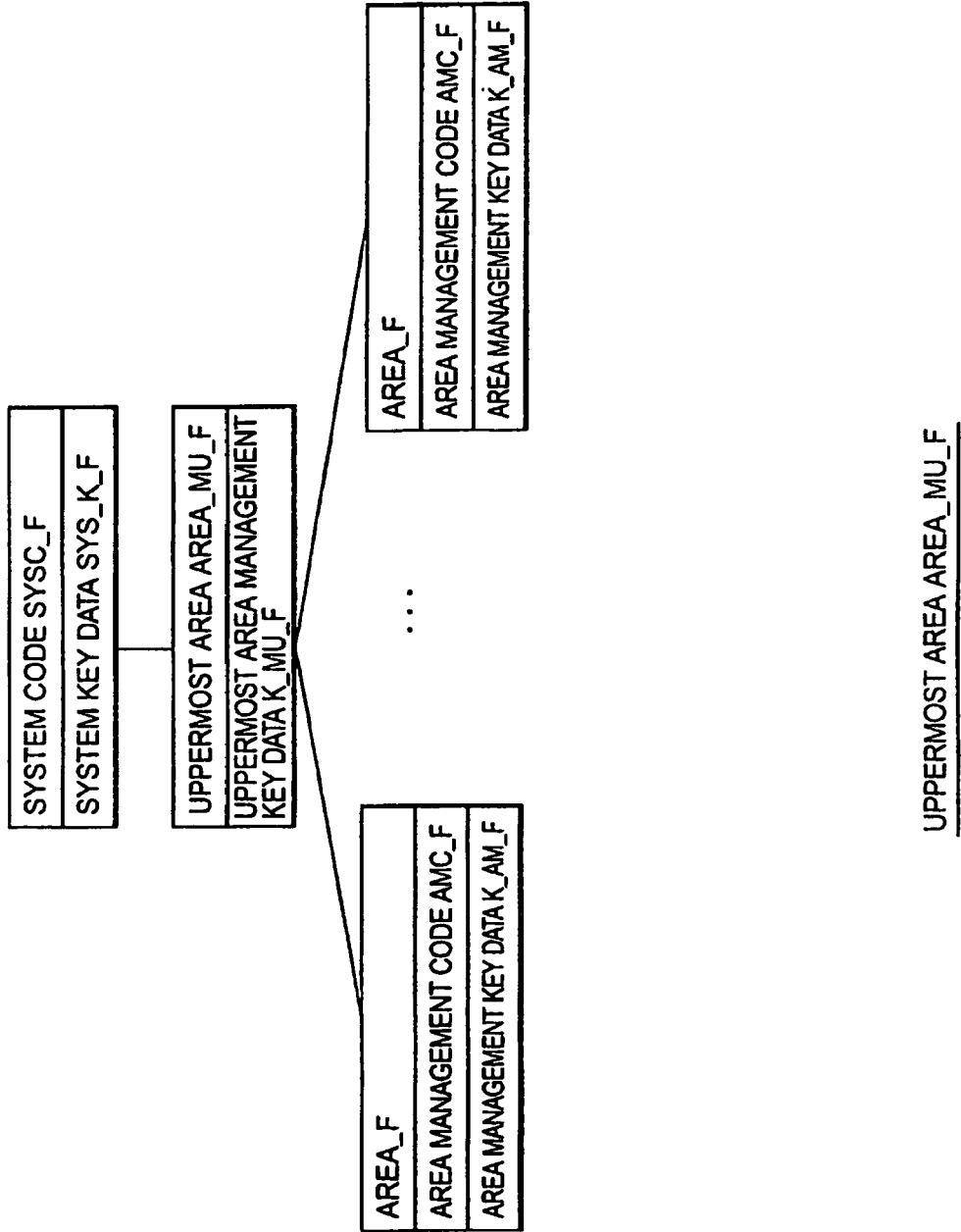
FIG. 23 is a view explaining a state after defining an area ("AREA") in the memory area of the IC card.

The processor 33 of the IC card 16 shown in FIG. 2 stores the area management key code AMC_F and the area management key data K_AM_F in the area registration permission information INF_RP decrypted at step ST72 in correspondence with the uppermost area AREA_MU_F formed at step ST66 in the memory 32 as shown in FIG. 23.

Next, the registration of file data to the IC card 16 by the operation file registration apparatus 15 performed at step ST6 shown in FIG. 8 will be explained.

Figure 24:
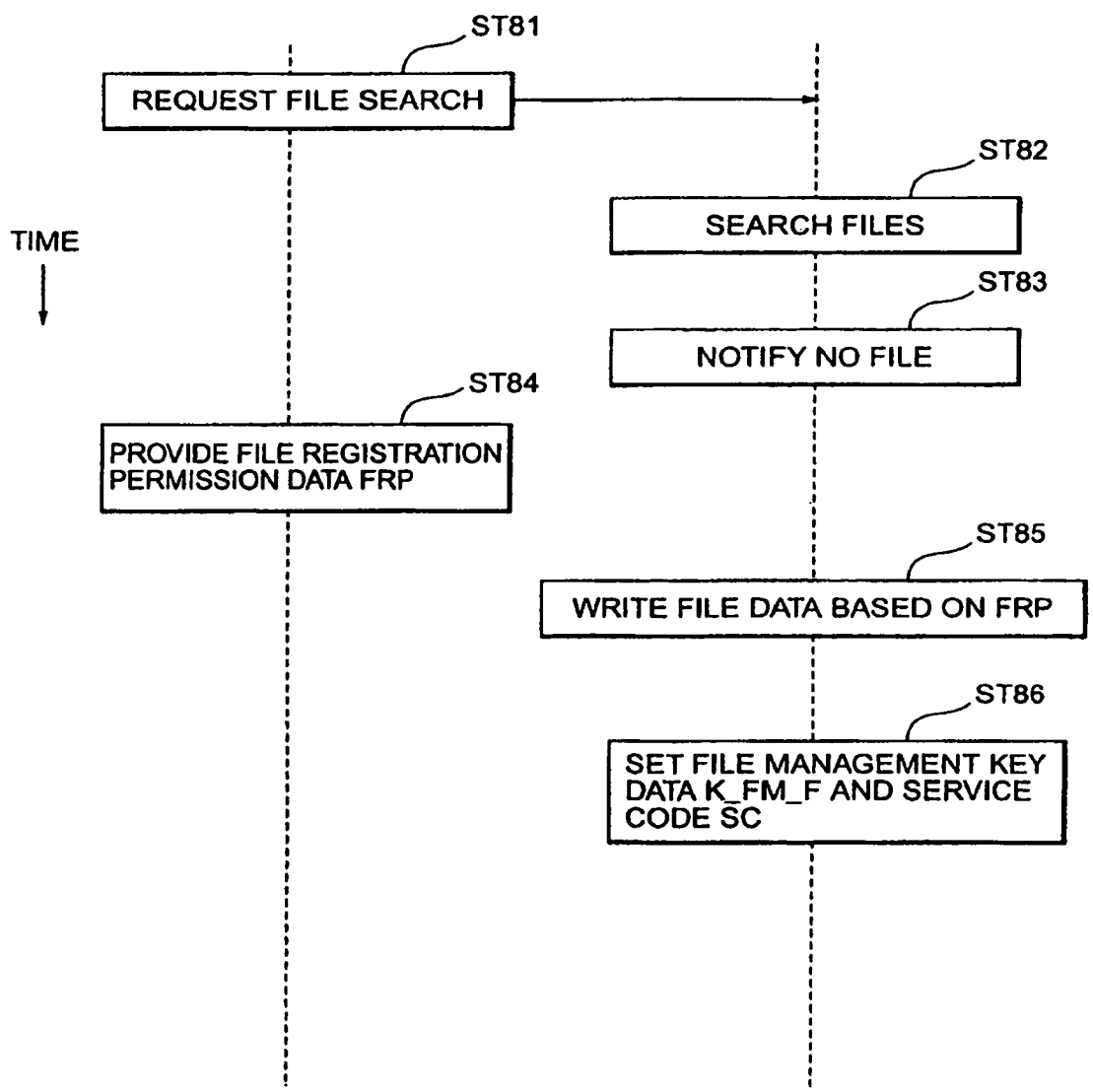
FIG. 24 is a view explaining registration processing of file data to the IC card by the operation file registration apparatus performed at step ST6 shown in FIG. 8.

FIG. 24 is a flowchart for explaining the processing.

Step ST81

The IC card holder 26 visits a store of the card memory area user 24 carrying the IC card 16 and loads the IC card 16 in the operation file registration apparatus 15.

Due to this, the processor 75 of the operation file registration apparatus 15 shown in FIG. 7 sends a file search request including information for specifying the card memory area user 24, such as a service code SC or system code SYSC_F, via the card interface 72 to the IC card 16.

Step ST82

When the input/output interface 31 receives the file search request at step ST81, the processor 33 of the IC card 16 shown in FIG. 2 searches whether or not file data of services relating to the card memory area user 24 is stored in the memory 32 based on the above information included in the file search request.

Step ST83

When it is judged that the file data of the services relating to the card memory area user 24 is not stored in the memory 32 by the file search at step ST82, the processor 33 of the IC card 16 notifies that the file does not exist to the operation file registration apparatus 15 via the input/output interface 31.

Step ST84

When a notice of no file is received at step ST83, the processor 75 of the operation file registration apparatus 15 shown in FIG. 7 outputs file registration permission data FRP encrypted by the area management key data K_AM_F shown in FIG. 19B stored in the memory 74 at step ST54 shown in FIG. 17 via the card interface 72 to the IC card 16.

The IC card 16 shown in FIG. 2 receives as input data, the file registration permission data FRP via the input/output interface 31.

Step ST85

Figure 25:
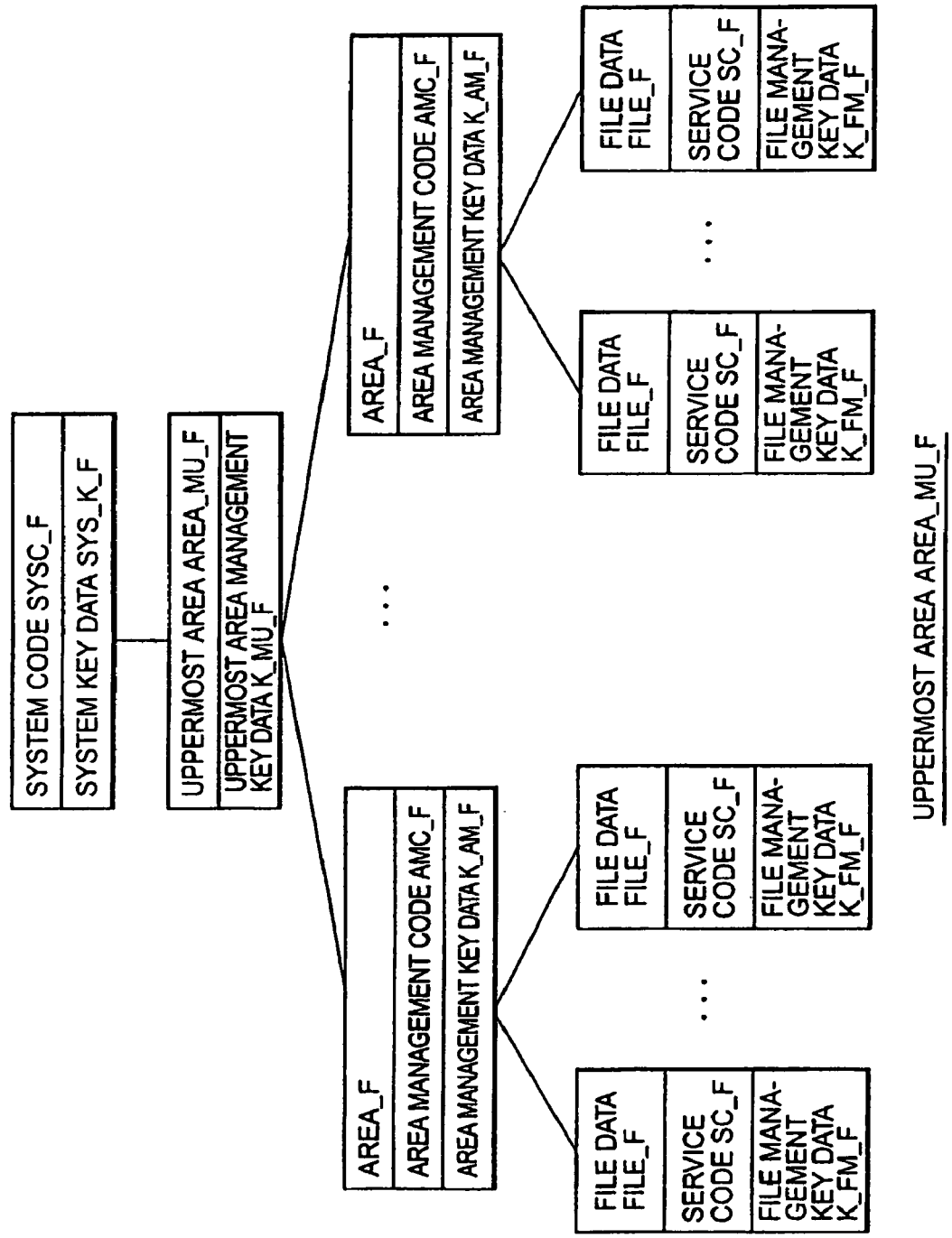
FIG. 25 is a view explaining the memory area of the IC card after the registration of the file data.

The processor 33 of the IC card 16 shown in FIG. 2 decrypts the file registration permission data FRP input at step ST84 by using the area management key data K_AM_F, uses the file management key data K_FM_F in the decrypted file registration permission data FRP, and writes file management key data K_FM_F related to the service of the card memory area user 24 in the uppermost area AREA_MU_F shown in FIG. 23. As a result, the uppermost area AREA_MU_F becomes as shown in FIG. 25.

Step ST86

The processor 33 of the IC card 16 shown in FIG. 2 writes the file management key data K_FM_F and the service code SC in the file registration permission data FRP decrypted at step ST85 in correspondence with the file data written at step ST85 in the memory 32.

In the communication system 1, for example, the card memory area operator 22 shown in FIG. 1 pays for the cost of receiving the loan of the memory area of the memory 32 of the IC card 16 to the IC card issuer 21 for example in units of blocks of the memory area.

Also, the card memory area operator 22 bills the cost for use of part of the memory area of the memory 32 of the IC card 16 for the service of the card memory area user 24 as a license fee, a service code SC registration use fee, an area AREA registration fee, etc. to the card memory area user 24.

As explained above, according to the communication system 1, when the IC card issuer 21 issues the IC card 16 to the card holder 26, file data relating to services provided by the card memory area user 24 can be registered in the unused memory area of the memory 32 of the IC card 16 based on predetermined conditions.

As a result, the card holder 26 can receive services of both the IC card issuer 21 and the card memory area user 24 by using a single IC card 16.

Also, according to the communication system 1, as explained above, the package data Pj is generated through the processing of the issuer communication apparatus 11 by using the Pf generated by the operator communication apparatus 12, provided to the IC card 16 via the operator communication apparatus 12 and the memory area division registration apparatus 14, and decrypted in the IC card 16. Consequently, the system code SYSC_F and the system key data SYS_K_F necessary for writing the file data to the memory area (uppermost area AREA_MU_F) used by the card memory area user 24 can be kept secret from the IC card issuer 21. Also, since the package data Pj is decrypted by using the system key data SYS_K_(i) in the IC card 16, the system key data SYS_K_(i) necessary for writing the file data to the memory area (uppermost area AREA_MU_F) used by the IC card issuer 21 can be kept secret from the card memory area operator 22 and the card memory area user 24.

Also, according to the communication system 1, by respectively defining the areas AREA_(i) and AREA_F in the uppermost area AREA_MU_(i) and the AREA_MU_F and by using the area management data K_AM_(i) and K_AM_F to write the file data to the AREA_F, illicit writing to the memory area can be further prevented.

Namely, according to the communication system 1, by dividing the memory area of the IC card 16 and keeping secret the key data used for a write operation of data on each of the divided memory areas from unauthorized persons, unauthorized access to the memory area is prevented.

As a result, it becomes possible for the unused area, which is not used by the IC card issuer 21 in the memory area of the IC card 16, to be safely used by a card memory area user 24 other than the IC card issuer 21 and thereby improves the convenience of the IC card 16.

The present invention is not limited to the above embodiment.

For example, in the above embodiment, setting various data to the memory area division registration apparatus 14 and the card memory area user 24 from the operator communication apparatus 12 after delivering the memory area division registration apparatus 14 and operation file registration apparatus 15 to the card memory area user 24 was explained. However, the information may be set before delivering the memory area division registration apparatus 14 and the operation file registration apparatus 15 to the card memory area user 24 under the control of the card memory area operator 22.

Also, an example of configuring the memory area division registration apparatus 14 and the operation file registration apparatus 15 as separate apparatuses was explained in the above embodiment. However, the apparatuses 14 and 15 may be realized as a single apparatus.

Also, in the above embodiment, an example of setting the memory area division registration apparatus 14 and the operation file registration apparatus 15 in a store of the card memory area user 24 was explained. The apparatuses 14 and 15 may also be set in a store of the operator communication apparatus 12.

Also, in the above embodiment, exclusive apparatuses were used as the memory area division registration apparatus 14 and the operation file registration apparatus 15, but the apparatuses may be realized by a personal computer, or other similar device, of the card memory area user 24 under the condition that it is an apparatus having a function of keeping secret data in accordance with need.

Below, an IC card system of an embodiment related to the above communication system 1 will be explained.

(1) Configuration of Embodiment (1-1) Basic Configuration

Figure 27:
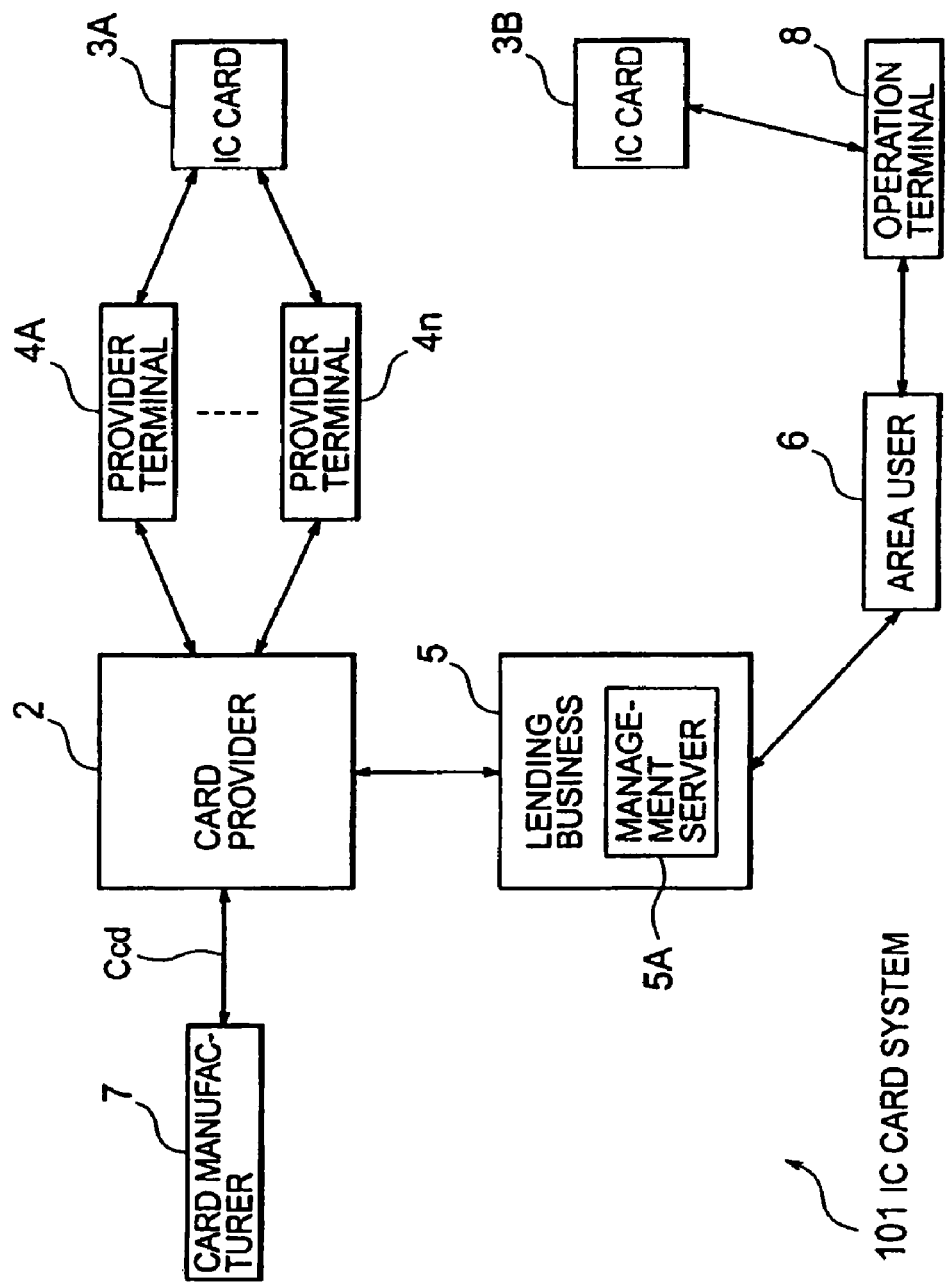
FIG. 27 is a block diagram showing the IC card system shown in FIG. 26.

FIG. 27 is a block diagram of the configuration of an IC card system according to the present embodiment.

In FIG. 27, an IC card 3A/3B corresponds to the IC card 16 shown in FIG. 1.

Also, a card provider 2 corresponds to the card issuer 21 and the issuer communication apparatus 11 shown in FIG. 1.

Also, a lending business 5 and a management server 5A correspond to the card memory area operator 22 and the operator communication apparatus 12 in FIG. 1.

Also, an area user 6 corresponds to the card memory area user 24 shown in FIG. 1.

Furthermore, an operation terminal 8 corresponds to the memory area division registration apparatus 14 and the operation file registration apparatus 15 shown in FIG. 1.

In the IC card system 101, the card provider 2 issues a non-contact type IC card 3A/3B free of charge or by purchase by a user and performs processing of for example cashing, passage of turnstiles at train stations, etc., by access from the provider terminal 4A to 4N by using the IC card 3A/3B. Also, a memory space of the IC card 3A/3B left over after the above use for a service relating to its own business is lent to a area user 6 desiring to use it by management of the lending business 5 or by its own management. Due to this, the IC card system 101 becomes capable of providing a variety of services not only to the card provider but to the area user 6 by the IC card 3A/3B. Note that in the IC card system 101, a series of processing is executed by a computer under management of the card provider 2, the lending business 5, the area user 6, etc. However, in the explanation below, for a simpler explanation and easy understanding, the configuration of the IC card system 101 will be explained by suitably setting the card provider 2, lending business 5, and area user 6, etc., as main components.

Namely, in the IC card system 101, a card manufacturer 7 produces the IC card 3A/3B upon order by the card provider 2 and delivers it to the card provider 2. At this time, the IC card 3A/3B is issued by recording a card code Ccd notified from the card provider 2 and a division processing key notified from the lending business 5. Here, the card code Ccd is an identification code unique to the IC card 3A/3B and selected by the card provider 2 by a later explained procedure. The division processing key is a key unique to the IC card 3A/3B relating to processing for preparing a system area separately. When the card provider 2 entrusts management of empty areas of the IC card 3A/3B to the lending business 5, the card provider 2 notifies the card code Ccd to the lending business 5, pays a license fee, obtains permission from the lending business 5, and issues the IC card 3A/3B.

On the other hand, the card provider 2 is the entity issuing the IC card 3A/3B and selects the card code Ccd, notifies the same to the card manufacturer 7, and receives the IC card 3A/3B from the card manufacturer 7. Also, when the IC card 3A/3B is delivered from the card manufacturer 7, the card provider 2 accesses the IC card 3A/3B by an exclusive access apparatus, that is, a reader/writer, and sets the services to be usable by the IC card 3A/3B. Here, in the processing, the card provider 2 sets a system area in the memory space of the IC card 3A/3B by transfer of data encrypted by using a predetermined key and sets a user area of a predetermined number of blocks (n blocks).

The card provider 2 records data necessary for accessing the user area, data necessary for updating the system area, data for specifying records of the system area, etc., in the system area and records files necessary for services expected to be provided in the user area.

Namely, the card provider 2 records area management information indicating the recording positions of the files and not recorded areas in units of block in the system area and enables access to desired files requested from an external apparatus by the area management information. Also, a file key for encrypting processing corresponding to the files, an application key applied to one service by a plurality of files, an area management key as a key for releasing encrypting corresponding to the card provider 2, and a system key for encrypting processing of all data to be input/output are recorded. As a result, in the blocks of the user area set in the IC card 3A/3B, encrypting of data input from the provider terminal 4A and 4B is released by a combination of the corresponding system key, the application key, the area management key, and the file key so that it is made possible to write in a predetermined memory space.

Also, the system key, the area management key, the application key, the area management key serving as a key for managing the file key, etc. are recorded. The system key etc. is updated only by access using the file management key, the application key and the file key.

Also, application codes unique to the services and a system code for specifying recording of the system area are recorded to enable the variety of services provided by the IC card 3A/3B to be identified by the application code and system code. Note that the IC card 3A/3B is configured so that files relating to one service are recorded in successive blocks, an address of the head block of the successive blocks is assigned to the application code, and thus, corresponding files are recorded in the memory space by using the application code as a reference. The files are made accessible by the area management information after being recorded.

If the IC card 3A/3B is usable by configuring the system area and user area as explained above, the card provider 2 provides the IC card 3A/3B to the card user for a fee or free of charge. Furthermore, when there is an access using the IC card 3A/3B from the provider terminals 4A and 4B serving as terminal apparatuses of services offered by the card provider 2, a predetermined service is provided.

Thus, the provider terminals 4A and 4B modulate information to be used for transmission by a predetermined carrier in a built-in reader/writer to drive a built-in antenna so as to repeatedly emit a call to the IC card 3A/3B at a predetermined cycle. Here, when the IC card 3A is held close to the antenna and a response to the call is sent from the IC card 3A, the reader/writer executes processing for mutual authentication with the IC card 3A and judges whether or not mutual data communication with the IC card 3A is possible.

When it is judged by the mutual authentication that mutual data communication is possible, the provider terminals 4A and 4B detect a response of the IC card 3A/3B to the call using the system code and thereby judge whether it is an IC card 3A/3B having a system area corresponding thereto or not. Furthermore, by obtaining a response of the IC card 3A/3B to the call using the system management key and the application code, it is judged whether the IC card 3A/3B relates to its own service. When judged to be an IC card 3A/3B relating to its own service as explained above, the provider terminals 4A and 4B access the user area by transferring encrypted data by a combination of the system key, area management key, application key, and file key.

For example when offering a service by electronic money, they execute processing for detecting an amount recorded on the IC card 3A, subtracting an amount used by the user from the balance and recording this in the IC card 3A. Also, when the card provider 2 issues points for purchases made by the user and offers a variety of services in accordance with the points, it executes processing for updating points. recorded on the IC card 3A in accordance with the amount of the purchase by the user.

The IC card 3A/3B is a non-contact type IC card which starts to operate by power induced by the built-in loop antenna and performs processing on a high frequency signal induced to the loop antenna by a predetermined signal processing circuit so as to receive the call from the reader/writer. The IC card 3A/3B sends a response to the call, further executes processing for mutual authentication upon request from the reader/writer for the response, and thus, judges whether data exchange is possible with the reader/writer.

Furthermore, it transmits a collation result of the system code and application code recorded in the system area to the reader/writer in response to a call using the system code and application code from the reader/writer and therefore, can execute a series of processing only when relating to a service scheduled to be provided by the reader/writer.

As a result, when confirmation is obtained by the reader/writer in this way, the IC card 3A/3B accesses corresponding files in accordance with access using the successively input system key, area management key, application key, and file key and thereby executes a series of processing by the file. Also, it secures an area for recording the file by updating the system area by gaining access using the area management key and the system management key and updates the system area by receiving registration of the file key, application code, and application key.

(1-2) Division of Area

The card provider 2 yields the management right of the unused areas of the memory space of the IC card 3A/3B to the lending business 5 or lends the memory space to the area user 6 which desires to use the IC card 3A/3B by the lending business 5 while holding the management right in its own hands. As a result, in this IC card system 101, even a terminal of the area user 6, that is, the operation terminal 8, can use services provided by the area user 6. Due to this, services of electronic money, ticketing, etc., offered by different businesses can be utilized as desired by the user by, for example, the IC card 3A/3B of a commuter's pass.

Thus, the operation terminal 8 is installed in a store of the user 6, provides services relating to an operation by the area user 6, and sets the IC card 3A/3B to be able to use the services of the area user 6 by an operation by the user in addition to the provision of these services.

Figure 26:
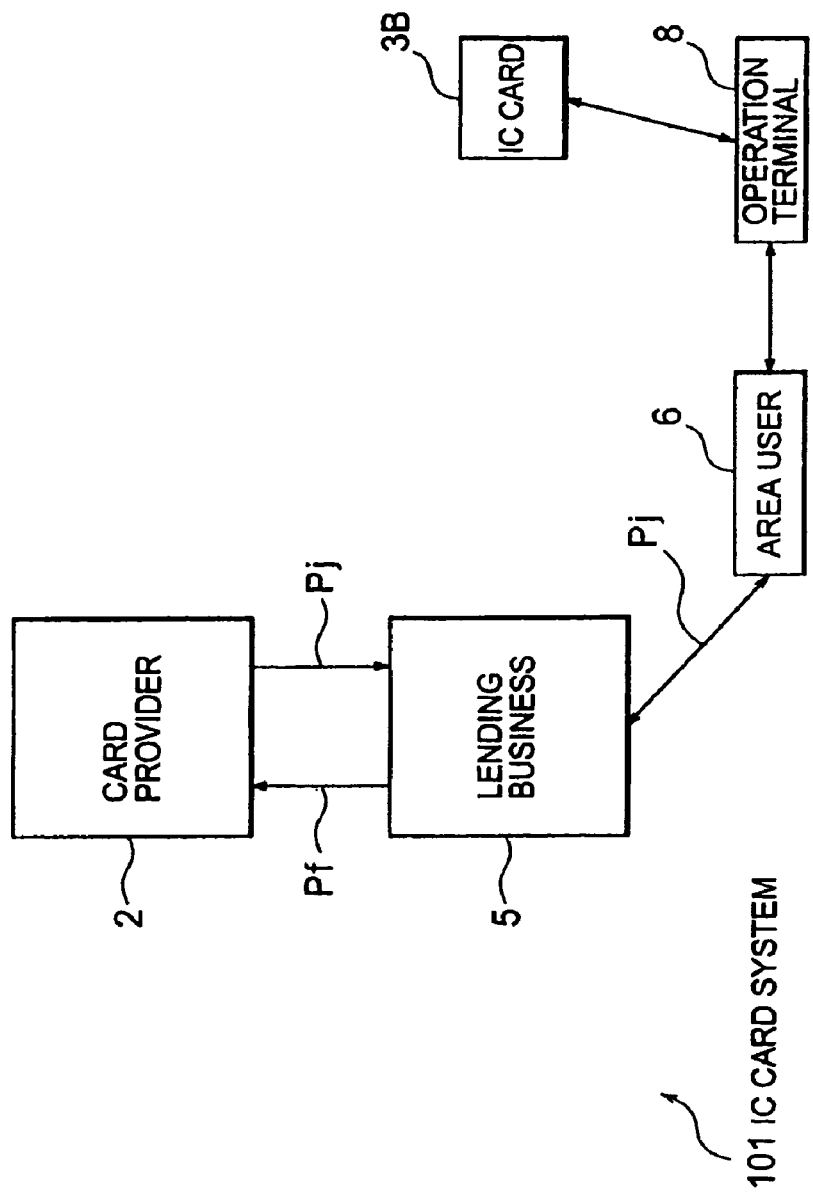
FIG. 26 is a block diagram explaining division of a memory space in an IC card system explained with reference to an embodiment of the present invention.
Figure 28:
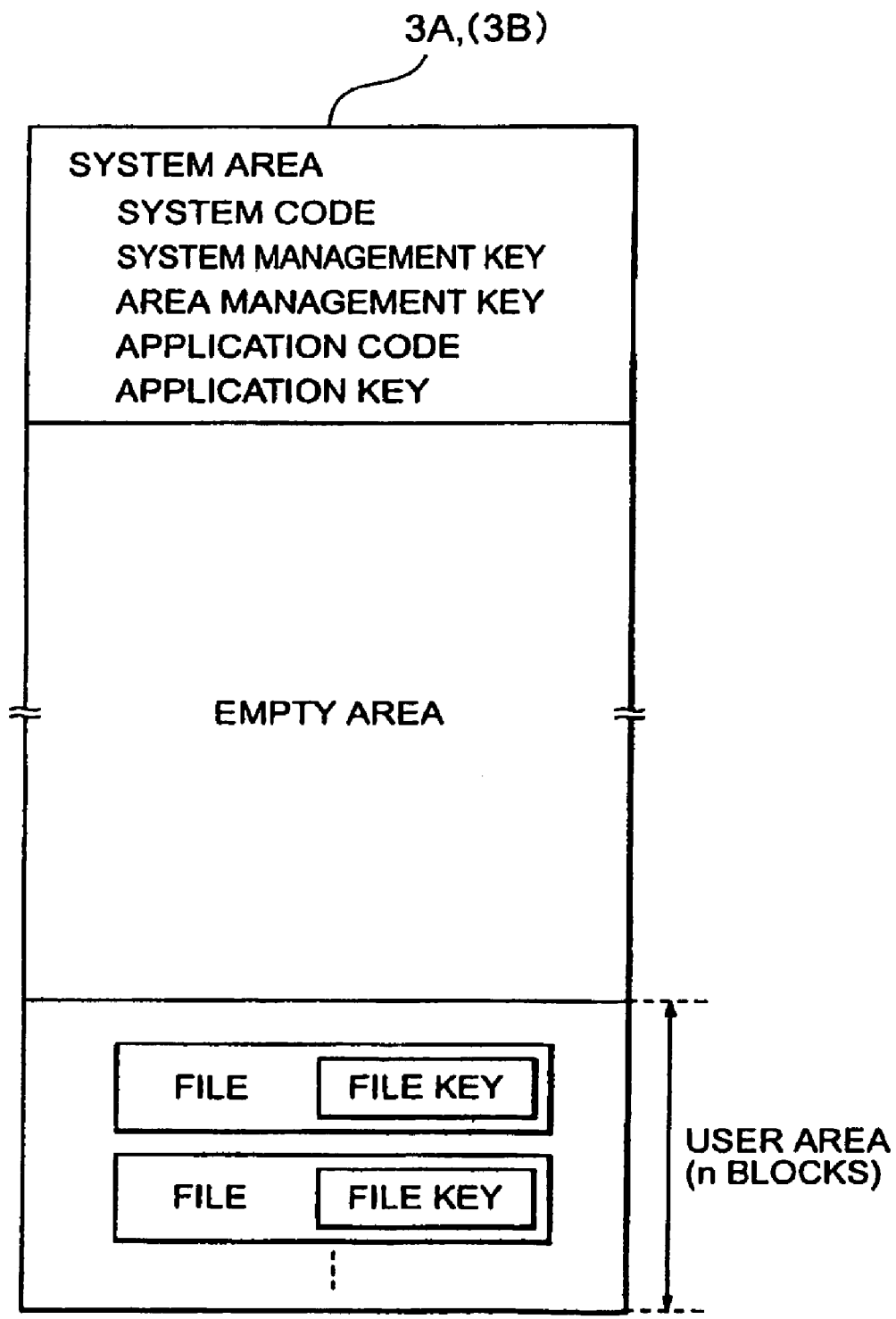
FIG. 28 is a simplified diagram explaining the memory space of the IC card shown in FIG. 26.
Figure 29:
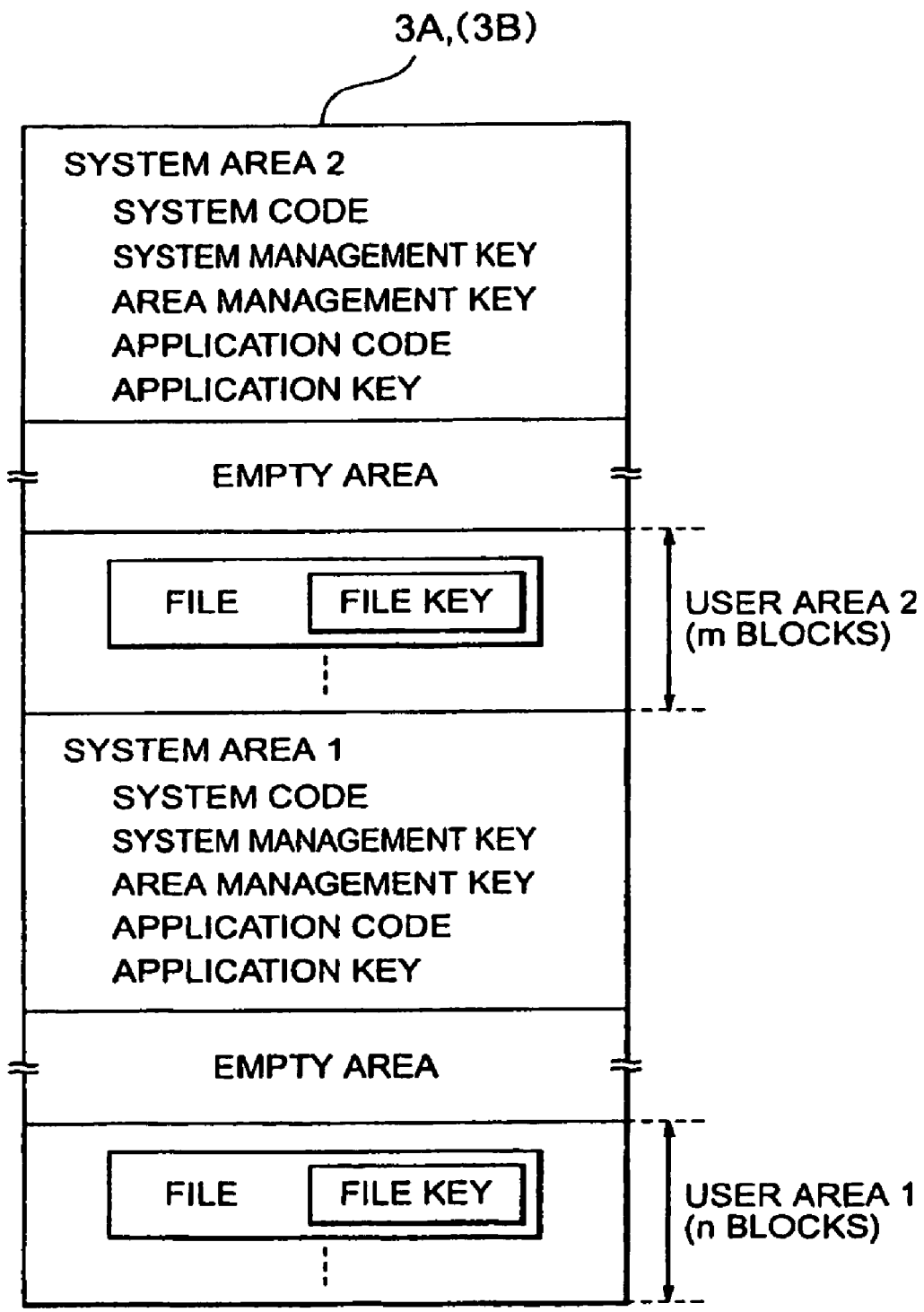
FIG. 29 is a simplified diagram of the memory space after division.

FIG. 26 is a block diagram of a series of processing in the case of transferring the management right of the unused areas therein to the lending business 5. Here, in the present embodiment, as shown in FIG. 28, the processing divides an empty area of the memory space into a predetermined number of blocks, separately sets a system area (hereinafter, referred to as a new system area) formed by setting the manager as the lending business in the divided areas in the same way as explained above with reference to FIG. 27, and manages the divided areas by the new system area.

Thus, the lending business 5 records data necessary for forming the new system area in the IC card 3A/3B by access to the IC card 3B by the operation terminal 8 using the system area set by the card provider 2. At this time, the lending business 5 secures a user area corresponding to the number of blocks authorized by the card provider 2. Furthermore, the lending business 5 prevents the secret information of the new system area, that is, the system management key, area management key, etc., from being kept secret from a third party including the card provider 2, and thereby makes the user area used by the area user 6 unaccessible even by the card provider 2.

Therefore, the lending business 5 specifically removes information relating to a file to be recorded on the user area and encrypts information comprising the new system area. The encryption is performed by an encrypting key corresponding to a division processing key to generate a package Pf and sends the package Pf to the card provider 2 together with information specifying the IC card 3A/3B. Note that the information here is prepared by information obtained by removing information related to specific services, such as a file key, application key, application code, etc. from various information of the above system area explained with reference to FIG. 28 arranged in a format corresponding to the configuration of the system area. Due to this, the lending business 5 keeps the area management key, system management key, etc. set in the new system area secret from the card provider 2 and provides information used for generating the system area to the card provider 2.

Subsequently, in the IC card system 101, by inputting/outputting information encrypted to enable release of the encrypting by a key for releasing encrypting recorded in the system area, that is, the system key, with the first terminal apparatus corresponding to the recording of the system area explained with reference to FIG. 28, that is, the provider terminal 4A/4B, the IC card 3A/3B, in which the memory space is accessed in accordance with the recording of the system area by the first terminal apparatus, is designed to encrypt information of the new system area corresponding to the system area to enable release of the encrypting by a predetermined area division key recorded in the IC card 3A/3B to generate encrypted information.

After the predetermined server adds dummy data to the thus notified package Pj in accordance with blocks lent to the lending business, the card provider 2 generates encrypted information by encrypting the information using the area management key and the system key and further encrypting the information by setting the application code etc. and system management key etc. so as to record the encrypted information in successive predetermined blocks in the memory space by management of the system area explained above with reference to FIG. 28. As a result, the card provider 2 generates a package Pj relating to the same configuration as a data stream sent from the provider terminals 4A and 4B when recording a file relating to a predetermined application to the blocks lent to the lending business 5 and provides the package Pj together with the mutual authentication key and system code to the lending business 5. Consequently, the card provider 2 keeps the area management key and system management key etc. of the original system area, which it manages itself, secret from the lending business 5 and provides the package Pj generating the new system area and a corresponding user area to the lending business 5 together with the mutual authentication key etc.

As a result, the lending business 5 obtains from the card provider 2 the package Pj relating to the area setting processing for a predetermined number corresponding to the charging processing together with the mutual authentication key etc. by advance processing and provides the same to the area user 6 conditional on executing charging processing for setting areas at the card provider 2 and obtaining permission from the card provider 2.

As opposed to this, the operation terminal 8 executes processing for mutual authentication relating to the new system area with the IC card 3B in the same way as the provider terminals 4A and 4B by settings in advance and receives the mutual authentication key from the area user 6 and executes processing for mutual authentication with the IC card 3B by the mutual authentication key when mutual authentication is not obtained. Here, when mutual authentication has been achieved, the IC card 3B notifies that fact to the area user 6 since it is an IC card to which a new system area is not yet set.

Accordingly, the area user 6 instructs to secure an area corresponding to the IC card 3B by sending the package Pj to the operation terminal 8. Due to the instruction, the operation terminal 8 uses the record of the previous system area related to usage of the provider terminals 4A and 4B and records information of the package Pj in a predetermined area of the IC card 3B. As a result, in the IC card system 101, the IC card 3B is made to secure a user area corresponding to the new system area. Also, corresponding to the encrypting processing of the package Pf by the card provider 2 at this time, it releases encrypting by the system key and area management key set in the original system area of the IC card 3B, the records by releasing encrypting by the division processing key and thereby forms the same new system area as the system area of the provider terminals 4A and 4B.

Also, the system sets the user area to be hard to access even by the card provider 2 by various kinds of keys set in the new system area and accordingly can completely entrust management of the memory space to the lending business 5.

As a result, in the IC card system 101, by setting the new system area by the lending business 5 in the memory space of the IC card 3A/3B and dividing the memory space as explained above, the management right of the divided memory space is transferred from the card provider 2 to the lending business 5.

Due to this, in the IC card system 101, in the same way as execution by the card provider 2 by management of the memory space by the original system area using the provider terminals 4A and 4B, and by the management of the memory space by the new system area using an exclusive terminal apparatus by the lending business 5, the lending business 5 can also provide a variety of services by managing the IC card 3A/3B.

In the above way, in the IC card system 101, a management computer at the card provider 2 side comprises a second encrypting means for further encrypting the encrypted information, that is, the package Pj, to enable release of the encrypted information by the area management key recorded in the previous system area, to generate the second encrypting information, that is, the package Pj. The management computer further comprises an input means for an operation terminal 8 to input the package Pj to the IC card 3A/3B by access of the IC card 3A/3B corresponding to the recording in the first system area, that is, the previous system area, by access of the IC card 3A/3B using the mutual authentication key of the provider terminals 4A and 4B by the operation terminal 8. Moreover, the computer releases the encrypted information of the package Pj in the IC card 3A/3B and records information of the new system area in the memory space of the IC card 3A/3B by access of the IC card 3A/3B corresponding to the first terminal apparatus.

(1-3) Lending of Memory Space

The lending business 5 lends memory space to the area user 6, which desires to use the IC card 3A/3B with respect to the divided memory space, when dividing the memory space of the IC card 3A/3B and receiving part of the management right in this way or with respect to the entrusted memory space when the lending of the memory space is entrusted by the card provider 2 while the card provider 2 keeps the management right at its own hands. As a result, in the IC card system 101, even more types of businesses can offer a variety of services using the IC card 3A/3B in common.

In the lending processing, when the card provider 2 and area user 6 do not desire to provide services using a single IC card 3A/3B in common, the lending business 5 limits the lending of the memory space by rejection processing. Due to this, for example, the memory space of the IC card 3A/3B is not lent for a service of a certain provider in a rival relationship with the card provider 2. Further, lending processing is selectively performed for an IC card 3A/3B relating to a rate desired by the area user 6. Due to this, the area user 6 can reject lending for example for an IC card 3A/3B at a high lending rate.

(1-3-1) Registration of Service

Figure 30:
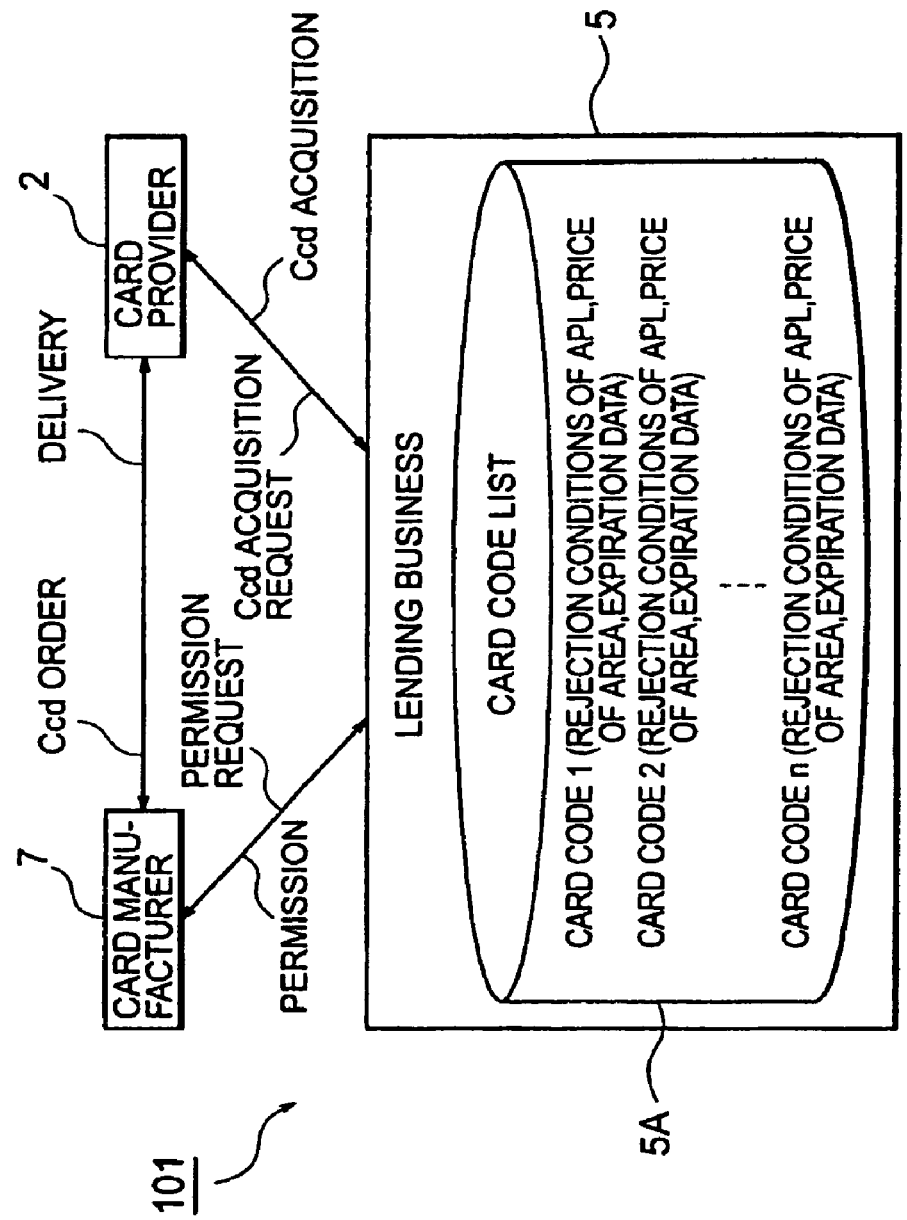
FIG. 30 is a simplified diagram explaining pre-processing of rejection processing in the IC card system shown in FIG. 26.

FIG. 30 is a block diagram for explaining pre-processing of the rejection processing in the IC card system 101. Namely, in the IC card system 101, the lending business 5 obtains from the IC card issuer 21, lending conditions together with the card code Ccd as to the IC card 3A/3B entrusted to be lent at the time of requesting production of the IC card 3A/3B to the card manufacturer 7 by the card provider 2 etc. Here, the lending conditions include rejection conditions of the application (APL), price of the area, and expiration date; the rejection conditions of an application include sectors and businesses for which lending is rejected and other data specifying services (for example, an application code); and the price of the area includes data for specifying a fee of one block relating to lending. Also, the expiration date is composed of data for specifying a lending period. As a result, when lending is rejected in this way, for example, prohibiting use of the IC card 3A/3B by rival businesses may be considered.

The lending business 5 records the obtained card code Ccd and the lending conditions in a management server 5A and thereby prepares a card code list formed by recording the card code Ccd and the lending condition of the IC card 3A/3B. Furthermore, the lending business 5 approves the card code Ccd for access from the card manufacturer 7.

Furthermore, the lending business 5 has the area user 6, which desires to use the IC card 3A/3B, set the operation terminal 8 and makes the operation terminal 8 function as a registration apparatus so that the area user 6 can register services. The area user 6 can access the IC card 3A/3B from the operation terminal 8 and use it for a variety of services.

Figure 31:
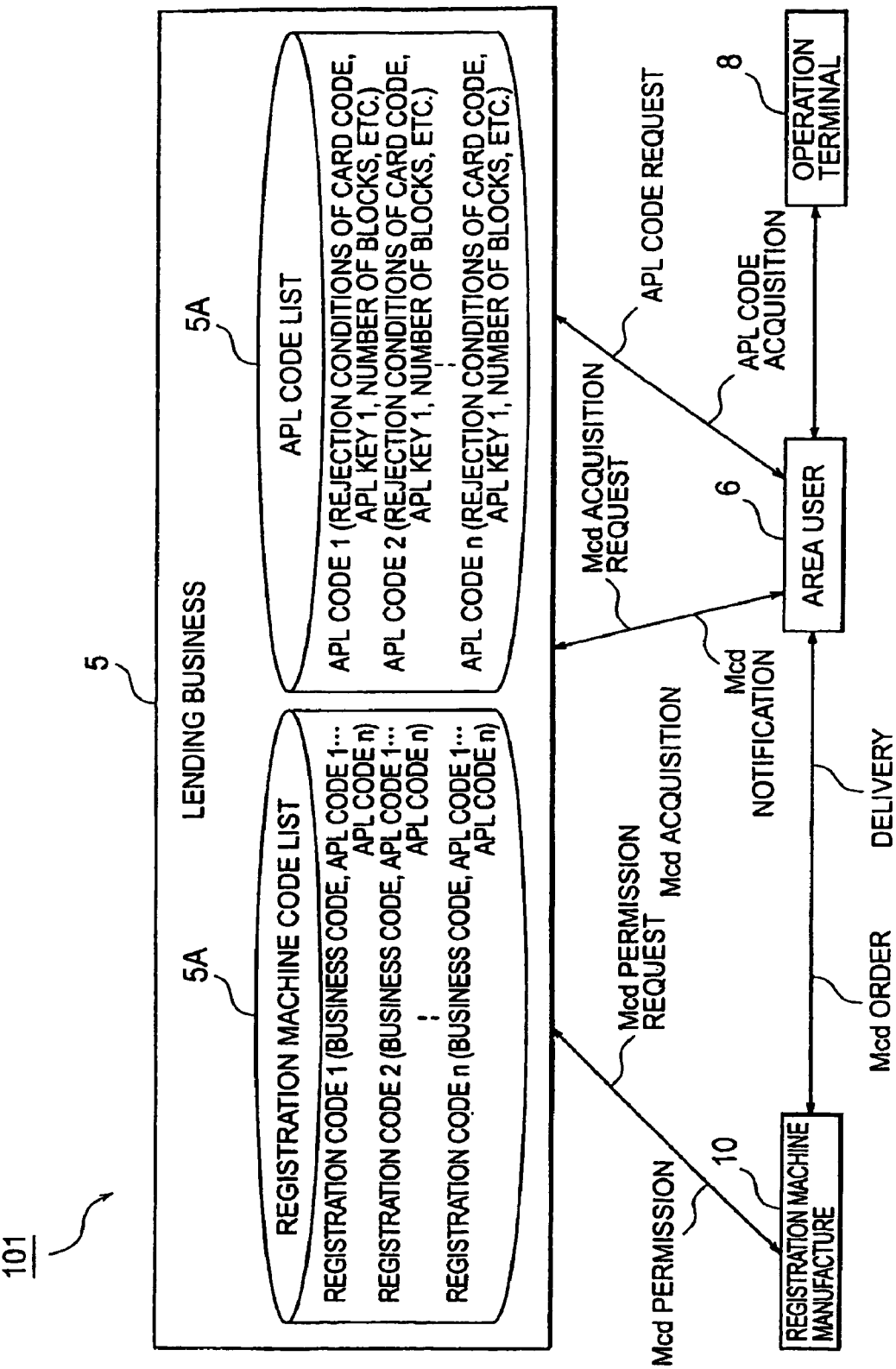
FIG. 31 is a simplified diagram explaining processing continued from the processing in FIG. 30.

The lending business 5 records information of the services to be registered from the operation terminal 8 in the management server 5A to generate a registration machine code list and an application code list shown in FIG. 31 and executes the rejection processing by judgement made by comparing these lists with the card code list.

Namely, when the lending business 5 authorizes the area user 6 to use the IC card 3A/3B under a contract formed with the area user 6, it issues an unused registration machine code Mcd to the area user 6 when there is an issuance request of a unique registration machine code Mcd from the area user 6 to the operation terminal 8. When issuing the registration machine code Mcd in this way, the management server 5A records a business code indicating that the operation terminal 8 relating to the registration machine code Mcd is related to the area user 6 and an application (APL) code of the services which the operation terminal 8 is scheduled to operate and prepares a registration machine code list. Note that when starting a new services of the area user 6 by the existing operation terminal 8, this can be dealt with by updating contents of a corresponding registration machine code at the time of requesting to obtain the application code related to the new services.

In the IC card system 101, when the registration machine code Mcd is notified from the lending business 5 to the area user 6, as explained above, the area user 6 asks a registration machine manufacturer 10 for an operation terminal 8 by the registration machine code Mcd. In this case, by the request for permission from the registration machine manufacturer 10, the lending business 5 approves production of the operation terminal 8 with the registration machine code Mcd. Thus, in the IC card system 101, the registration machine manufacturer 10 produces the operation terminal 8 by recording the registration machine code Mcd. Then, the operation terminal 8 is delivered to the area user 6, and a license fee is charged in this case.

In the IC card system 101, for an operation terminal 8 delivered to the area user 6 explained above, when the area user 6 requests issuance of an application code relating to the new services by the operation terminal 8, the lending business 5 selects an unused application code, notifies the same, and updates contents of the registration machine code list by the application code. Furthermore, the number of blocks of the IC card 3A/3B relating to lending set by the contract, rejection conditions of the IC card (rejection conditions of a card code) which the lending business 5 does not desire to use, etc. are recorded in the management server 5A along with a corresponding application key so as to prepare the application (APL) code list. Note that in FIG. 31, the rejection conditions of the card code are records of card codes of the IC cards which the lending business 5 does not desire to use, specifically, card codes and usage fees that are blocked for use. As a result, where a rival business of the area user 6 is the card provider 2, a case of a high usage rate, etc. may be considered.

Figure 32:
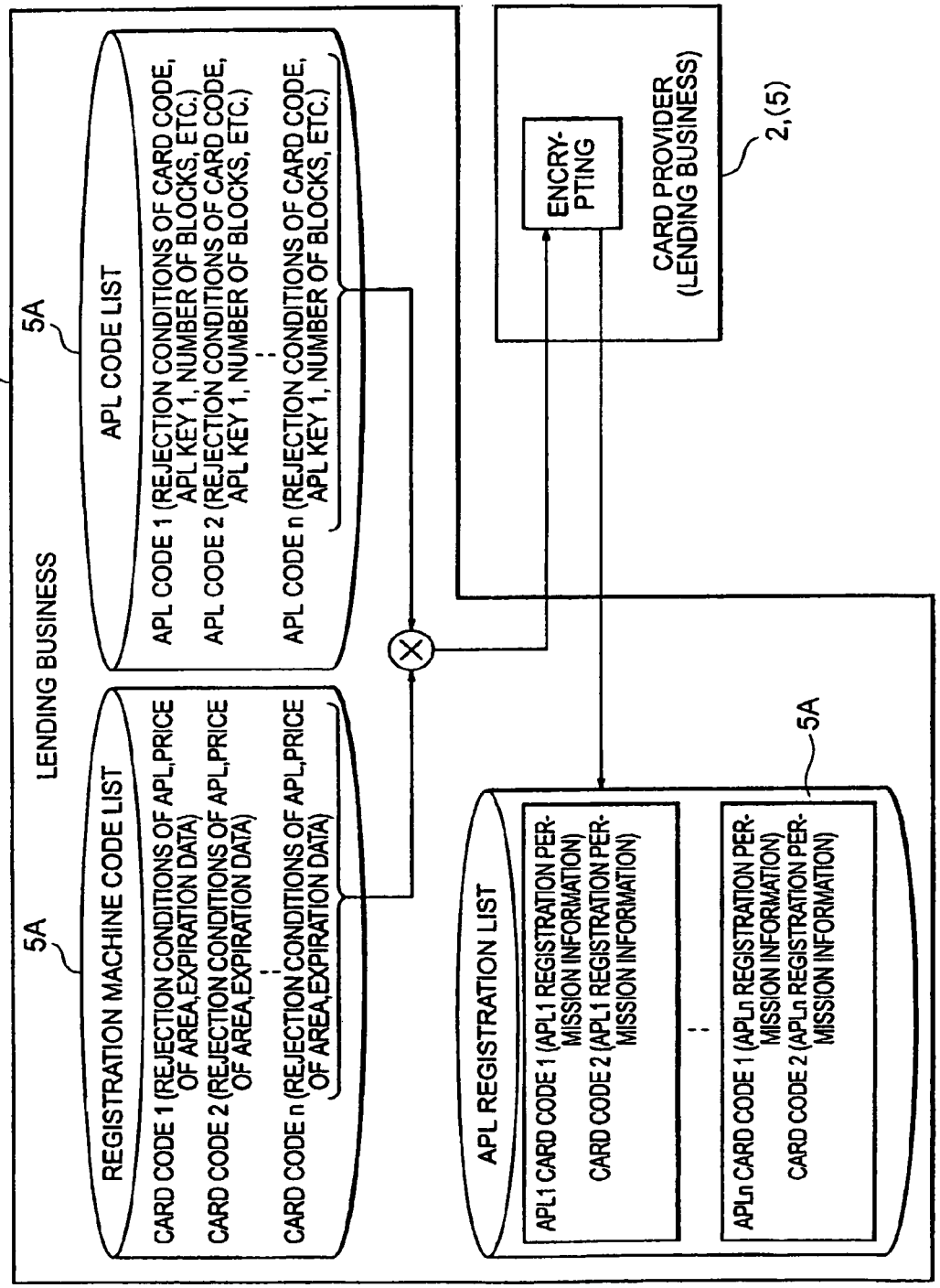
FIG. 32 is a simplified diagram explaining processing continued from the processing in FIG. 31.

When preparing a list in this way, as shown in FIG. 32, the lending business 5 compares conditions for recording to the card code list with conditions for recording to the application code list for every application code and card code and thereby prepares a list of registration permission information for registering services to the IC card 3A/3B except for combinations of registration of services by the area user 6 which the card provider 2 does not desire and combinations of registration of services to the IC card 3A/3B which the area user does not desire etc.

At this time, the lending business 5 sends the registration permission information from the operation terminal 8 to the IC card 3A/3B, records an application code and an application key corresponding to the IC card 3A/3B in the IC card 3A/3B, and prepares a list by recording the registration permission information so that the number of blocks for recording corresponding files can be secured. Note that when the lending business 5 is only entrusted with lending of a memory space, since the area management information, system key, and system management key recorded in the system area necessary for preparing such registration permission information are known only by the card provider 2, information of the application code, application key, and number of blocks are notified to the card provider 2 and registration information is generated through encryption by the card provider 2. As opposed to this, when providing services in a memory space corresponding to the system area by registering the information to the system area managed by the lending business, since area management information, system key, and system management key recorded in the system area are known only by the lending business 5, the registration information is generated by processing of the lending business 5 by itself.

When data exchange is started between the operation terminal 8 and the IC card 3A/3B in a state where the application registration list is prepared in advance as explained above, when the system area relating to the operation terminal 8 is not formed in the IC card 3A/3B, the system area is formed and then existence of a record of an application code relating to the services of the operation terminal 8 is confirmed in the operation terminal 8. Here, when the application code is not recorded in the IC card 3A/3B, it is considered that files relating to the services of the operation terminal 8 are not yet registered in the IC card 3A/3B. At this time, when a plurality of services are provided by the operation terminal 8, the operation terminal 8 issues a command to the IC card 3A/3B to successively read the application code and detects services which are not yet registered from the read application code. Furthermore, existence of provision of detected services which are not yet registered, is confirmed for the user which carries the IC card 3A/3B. If the user desires a service here, the registration machine code and service code are notified to the lending business 5 via the area user 6.

Furthermore, when searching through the application registration list by using a search result of the registration machine code list by the registration machine code as a reference and recording registration permission information as a registerable service, the registration permission information of the corresponding application is notified from the application registration list to the operation terminal 8. On the other hand, when registration permission information of the corresponding application is not registered, since registration is difficult due to the above rejection processing, the user is informed of it via the operation terminal 8.

In the IC card system 101, a registration key K used for registering a file necessary for providing a service is also notified from the area user at the time of notifying the registration permission information to the operation terminal 8. The operation terminal 8 accesses the IC card 3B by the registration permission information to enable registration of a file and file key relating to a service. Then, by accessing the IC card 3B using the registration key K notified from the area user 6, the file and corresponding file key relating to the service are registered. Thus, in the IC card system 101, the area user 6 uses the memory space lent from the lending business 5 or the area user 6 uses the memory space lent from the card provider 2 and the lent memory space is managed by the file key kept by the area user 6, so a variety of services can be provided.

When the services become available in this way, the operation terminal 8 prints a sticker indicating the newly usable service by a built-in printer and provides the sticker to the user of the IC card 3B. As a result, in the IC card system 101, even in the case where a large number of services are recorded in the IC card 3B, the user can confirm the available services by adhering the stickers on the IC card 3B. Note that instead of printing such a sticker, it is possible to directly print the information on the IC card 3B.

As explained above, when a service becomes available by the IC card 3B, the lending business 5 performs charging relating to collection of fees at the time of registration in the area user 6 and charging relating to payment of the registration fee in the card provider 2. Furthermore, the registration is listed for each card code of the IC cards and records left. The lending business 5 performs charging for use of the card for example in units of months by periodic tabulation of the records.

Note that the series of processing of the data processing method of the present invention can be executed by hardware, but can also be executed by software (program). When executing the series of processing by software, it is possible to install the software from a storage medium or downloaded it via a network into a computer incorporating a program comprising the software in exclusive hardware or a general-use personal computer capable of executing a variety of functions by installation of a variety of programs etc.

As explained above, according to the present invention, it is possible to provide a data processing method, system, and apparatus which can deal with a variety of demands including security aspects of a service provider when a plurality of businesses share a single IC card.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An integrated circuit card configured to be usable with a first service provider and at least one different service provider, the integrated circuit card comprising:
    an integrated circuit configured to store key memory area division data and first area management key data;
    a memory area including:
        (a) a designated first portion; and
        (b) a second portion designated by the key memory area division data; and
    a memory operation unit configured to:
        (a) manage the key memory area division data;
        (b) encrypt first module data including second area management key data using the key memory area division data; and
        (c) provide said encrypted first module data to the first service provider;
    said first service provider being configured to:
        (a) issue the integrated circuit card;
        (b) provide a first service using the designated first portion of the memory area;
        (c) encrypt second module data including the encrypted first module data by using the first area management key data; and
        (d) provide the encrypted second module data to the memory operation unit; and
    the integrated circuit card being configured to perform at least one of a write operation and a rewrite operation to the second portion of the memory area, provided that the first area management key data authorizes the at least one different service provider to provide a second service using the second portion of the memory area.

2. A method of processing data for an integrated circuit card including an integrated circuit and an memory area, said integrated circuit card being configured to be usable with a first service provider and at least one different service provider, the method comprising:
    (a) causing the integrated circuit to store key memory area division data and first area management key data;
    (b) causing the first service provider to issue the integrated circuit card;
    (c) providing a first service from the first service provider using a designated first portion of said memory area, said memory area including a second portion designated by the key memory area division data;
    (d) performing at least one of a write operation and a rewrite operation to the second portion of the memory area, provided that the first area management key data authorizes the at least one different service provider to provide a second service using the designated second portion of said memory area;
 (e) causing a memory area operation unit to:
  (i) manage said key memory area division data; and
  (ii) encrypt first module data which includes second area management key data by the key memory area division data;
 (f) providing the first module data to the first service provider;
 (g) encrypting second module data including the encrypted first module data by using said first area management key data; and
 (h) providing the second module data to said memory area operation unit.

3. The method of claim 2, which includes causing the memory area operation unit to provide the encrypted second module to the integrated circuit.

4. The method of claim 3, which includes causing the memory area operation unit to decrypt the first module data in the decrypted second module data by using the key memory area division data.

5. A data processing apparatus comprising:
 an input/output device;
 a processor configured to cause a portable device to:
  (a) store:
   (i) distribution key data; and
   (ii) a system code for identifying a first service provider, said portable device including an integrated circuit having a memory area, said portable device being configured to be usable with said first service provider and a plurality of different service providers including a second service provider; and
  (b) perform at least one of a write operation to said memory area and a rewrite operation to said memory area provided that a first area management key data requires the second service provider to provide a second service using part of said memory area when issued by the first service provider providing a first service using said memory area; and
 a memory device which stores a module including second area management key data, said second area management key data being:
  (a) issued by a memory area operation unit configured to manage processing of the data processing apparatus; and
  (b) encrypted by the memory area operation unit using key memory area division data and a registerable system code list indicating the system code added to the first service provider which can provide service by the same integrated circuit as the second service provider.

6. The data processing apparatus of claim 5, wherein the input/output device receives as input the system code from the integrated circuit.

7. The data processing apparatus of claim 6, wherein the processor is further configured to output the module to the integrated circuit via the input/output device when it judges that the input system code is indicated in the registerable system code list.

8. The data processing apparatus of claim 5, wherein the processor is further configured to output a module to the integrated circuit via the input/output device when it judges that the input system code is indicated in a registerable system code list.

9. The data processing apparatus of claim 5, wherein the memory device stores rejection information specifying a service provider which can provide service by the same integrated circuit indicated by the first service provider and the second service provider.

10. The data processing apparatus of claim 5, wherein the processor is further configured to generate a registerable system code list indicating the system code added to the first service provider which can provide service by the same integrated circuit as the second service provider based on rejection information stored in the memory device.

11. A data processing apparatus comprising:
 a processor configured to:
  (a) cause a portable device to:
   (i) store:
    (A) distribution key data; and
    (B) a system code for identifying a first service provider, said portable device including an integrated circuit having a memory area, said portable device being configured to be usable with said first service provider and a plurality of different service providers including a second service provider; and
   (ii) perform at least one of a write operation to said memory area and a rewrite operation to said memory area provided that a first area management key data requires the second service provider to provide a second service using part of said memory area when issued by the first service provider providing a first service using said memory area; and
  (b) encrypt a first module including second management key data by using the key memory area division data; and
 an input/output device configure to:
  (a) output the encrypted first module to provide it to the first service provider;
  (b) receive as input a second module including the encrypted first module and encrypted in the first service provider by using the first area management key data; and
  (c) output the second module to provide it to a memory area division apparatus for dividing the memory area under control of the second service provider so that a part of the memory area of the integrated circuit can be used by the second service provider.

* * * * *